United States Patent
Morales et al.

(10) Patent No.: US 9,846,975 B2
(45) Date of Patent: Dec. 19, 2017

(54) GENERATING FILTERED, THREE-DIMENSIONAL DIGITAL GROUND MODELS UTILIZING MULTI-STAGE FILTERS

(71) Applicant: Skycatch, Inc., San Francisco, CA (US)

(72) Inventors: Leonardo Felipe Romo Morales, Jalisco (MX); David Chen, San Francisco, CA (US)

(73) Assignee: SKYCATCH, INC., San Francisco, CA (US)

( * ) Notice: Subject to any disclaimer, the term of this patent is extended or adjusted under 35 U.S.C. 154(b) by 89 days.

(21) Appl. No.: 15/047,512

(22) Filed: Feb. 18, 2016

(65) Prior Publication Data

US 2017/0243404 A1 Aug. 24, 2017

(51) Int. Cl.
| | |
|---|---|
| G06K 9/00 | (2006.01) |
| G06T 19/20 | (2011.01) |
| G06T 7/00 | (2017.01) |
| G06T 5/30 | (2006.01) |
| G06T 7/60 | (2017.01) |
| G06T 5/40 | (2006.01) |

(52) U.S. Cl.
CPC .......... *G06T 19/20* (2013.01); *G06T 5/30* (2013.01); *G06T 5/40* (2013.01); *G06T 7/0081* (2013.01); *G06T 7/60* (2013.01); *G06T 2207/20112* (2013.01); *G06T 2207/30181* (2013.01); *G06T 2210/56* (2013.01)

(58) Field of Classification Search
CPC .. G06T 19/20; G06T 5/30; G06T 5/40; G06T 7/0081; G06T 7/60
See application file for complete search history.

(56) References Cited

U.S. PATENT DOCUMENTS

| | | | |
|---|---|---|---|
| 7,133,539 B2 | 11/2006 | Ohto | |
| 9,367,743 B1* | 6/2016 | Haglund | ............... G06K 9/0063 |
| 2006/0013442 A1* | 1/2006 | McDowall | .............. G01S 17/89 |
| | | | 382/109 |
| 2010/0091611 A1* | 4/2010 | Laake | ...................... G01V 1/30 |
| | | | 367/38 |

(Continued)

FOREIGN PATENT DOCUMENTS

WO     WO 2017-143351         8/2017

OTHER PUBLICATIONS

International Search Report & Written Opinion as received in PCT/US2017/018763 dated Jul. 18, 2017.

(Continued)

*Primary Examiner* — David F Dunphy
(74) *Attorney, Agent, or Firm* — Keller Jolley Preece

(57) ABSTRACT

Disclosed systems and methods generate filtered, three-dimensional models with regard to a site. In particular, one or more embodiments include systems and methods that generate a filtered, three-dimensional model by removing one or more non-ground objects from a three-dimensional model of the site. Specifically, one or more embodiments of the disclosed systems and methods remove objects from a three-dimensional representation of a site by applying an initial filter to the three-dimensional representation, identifying regions corresponding to types of terrain within the three-dimensional representation, and applying another filter with parameters particular to the identified regions.

20 Claims, 12 Drawing Sheets

(56) References Cited

U.S. PATENT DOCUMENTS

| | | |
|---|---|---|
| 2010/0206557 A1 | 8/2010 | Davies |
| 2013/0096886 A1 | 4/2013 | Vorobyov et al. |
| 2013/0230206 A1* | 9/2013 | Mendez-Rodriguez ............ G01S 17/89 382/103 |
| 2013/0238305 A1 | 9/2013 | Digiacobbe et al. |
| 2014/0098094 A1 | 4/2014 | Neumann et al. |
| 2014/0211005 A1* | 7/2014 | Dow .................. G01B 11/24 348/144 |
| 2017/0178341 A1* | 6/2017 | El-Sheimy ............ G06T 7/136 |

OTHER PUBLICATIONS

U.S. Appl. No. 15/047,512, filed Aug. 10, 2017, Notice of Allowance.

* cited by examiner

First Region

| Number of Height Differences | 350 | 100 | 50 | 25 | 25 |
|---|---|---|---|---|---|
| Height Differences | 0-1 | 1-2 | 2-3 | 3-4 | 4-5 |

Second Region

| Number of Height Differences | 50 | 300 | 200 | 50 | 50 |
|---|---|---|---|---|---|
| Height Differences | 0-1 | 1-2 | 2-3 | 3-4 | 4-5 |

Third Region

| Number of Height Differences | 100 | 200 | 400 | 50 | 50 |
|---|---|---|---|---|---|
| Height Differences | 0-1 | 1-2 | 2-3 | 3-4 | 4-5 |

GENERATING FILTERED, THREE-DIMENSIONAL DIGITAL GROUND MODELS UTILIZING MULTI-STAGE FILTERS

BACKGROUND

1. Technical Field

One or more embodiments of the present disclosure relate generally to ground filtering. More specifically, one or more embodiments of the present disclosure relate to systems and methods that generate filtered, three-dimensional digital ground models.

2. Background and Relevant Art

Recent years have seen a proliferation in utilization of digital ground imaging and modeling. Indeed, partly as a result of reduced costs associated with capturing digital aerial images and terrain data via unmanned aerial vehicles (UAVs), businesses and individuals now have increased access to images and models that may have been cost prohibitive to generate in the past. For example, businesses can now utilize one or more UAVs to capture digital terrain information with regard to a construction site, a mining site, a wilderness area, or some other site at a relatively low-cost compared to previous years.

In many applications, however, individuals and businesses capture terrain data that includes unwanted objects or features. For example, an individual may capture a three-dimensional representation of a site that includes vehicles, machinery, people, structures, vegetation or other objects. Some common modeling systems include filters that attempt to remove such unwanted objects and produce digital models that include only ground information (i.e., "ground filters").

Common modeling systems utilizing ground filters, however, frequently over-filter or under-filter pertinent digital information. For example, common systems may over-filter by removing wanted objects (e.g., points reflecting the ground) rather than unwanted objects (e.g., a vehicle). Similarly, common systems may under-filter by failing to remove unwanted objects (e.g., leaving a building in the model).

Moreover, some common modeling systems utilize ground filters that are only accurate with regard to certain types of terrain. For instance, some traditional systems remove unwanted objects from a ground model on flat terrain, but fail to do so with regard to hilly or mountainous terrain. Such limitations are particularly troublesome in modeling a large site that includes both flat and sloped terrain. In such applications, common systems often fail to accurately filter unwanted objects and produce an accurate digital ground model.

These and other problems exist with regard to generating digital ground models.

BRIEF SUMMARY

Embodiments of the present disclosure provide benefits and/or solve one or more of the foregoing or other problems in the art with systems and methods that apply multiple filters to remove extraneous objects from three-dimensional representations (e.g., 3D models). In particular, in one or more embodiments, the disclosed systems and methods apply an initial filter to assist in identifying regions within the three-dimensional representation. Moreover, one or more embodiments of the disclosed systems and methods apply one or more additional filters with different parameters based on the identified regions (i.e., region specific parameters). Thus, one or more embodiments include systems and methods that apply filters with different parameters to different regions of a site. In this manner, systems and methods can more accurately remove extraneous objects, points, or features from three-dimensional representations of a site.

For example, one or more embodiments include systems and methods that apply a first filter to a three-dimensional representation of a site utilizing a first set of one or more filter parameters. Moreover, in one or more embodiments, the disclosed systems and methods define a first region of the filtered three-dimensional representation corresponding to a first type of terrain. Specifically, the first region comprises a first plurality of points that are a subset of points from the filtered three-dimensional representation. Then, the disclosed systems and methods can generate a final three-dimensional representation by applying a second filter to the first region utilizing a second set of one or more filter parameters that are different from the first set of one or more filter parameters. In addition, in one or more embodiments the disclosed systems and methods present the final three-dimensional representation for display.

By applying an initial filter to identify regions, and then additional, region specific filters, the disclosed systems and methods reduce the risk of over-filtering or under-filtering objects from a three-dimensional representation. For instance, one or more embodiments include systems and methods that apply an initial filter with less aggressive parameters. The initial filter may under-filter, but enables the systems and methods to more accurately identify regions of varying types of terrain. With information regarding the varying types of terrain, systems and methods can then apply more aggressive filter parameters suited to the identified terrains. By applying parameters suited to the particular identified regions (i.e., particular types of terrain), the systems and methods avoid over-filtering or under-filtering objects from three-dimensional representations.

Moreover, by applying parameters specific to particular identified regions, the disclosed systems and methods provide accurate filtering, even in sites containing varying types of terrain. For example, a three-dimensional representation of a site may include a variety of flat regions and steep regions. In one or more embodiments, the disclosed systems and methods apply an initial filter to the three-dimensional representation, divide the three-dimensional representation into regions, and then apply parameters suitable to the particular regions. Thus, the disclosed systems and methods provide accurate results, regardless of the variety or type of terrain included in a particular site.

Furthermore, by applying filters in stages, one or more embodiments of the disclosed system and methods result in faster processing times. Indeed, by applying an initial filter, one or more embodiments of the disclosed systems and methods remove non-ground points utilizing more general filter parameters before identifying regions and applying more specific filter parameters to each region. By attacking three-dimensional representations in this manner, the disclosed systems and methods produce not only more accurate filtered, three-dimensional ground models, but produce filtered, three-dimensional ground models more quickly.

Additional features and advantages of exemplary embodiments of the present disclosure will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter. The foregoing summary is not an extensive overview, and it is not intended to identify key elements or indicate a scope. Rather the foregoing summary identifies aspects of embodiments as a prelude to the detailed description presented below.

BRIEF DESCRIPTION OF THE DRAWINGS

In order to describe the manner in which the above recited and other advantages and features can be obtained, a more particular description will be rendered by reference to specific embodiments that are illustrated in the appended drawings. It should be noted that the figures are not drawn to scale, and that elements of similar structure or function are generally represented by like reference numerals for illustrative purposes throughout the figures. Understanding that these drawings depict only typical embodiments and are not therefore to be considered to be limiting, various embodiments will be described and explained with additional specificity and detail through the use of the accompanying drawings in which.

DETAILED DESCRIPTION

Figure 1:
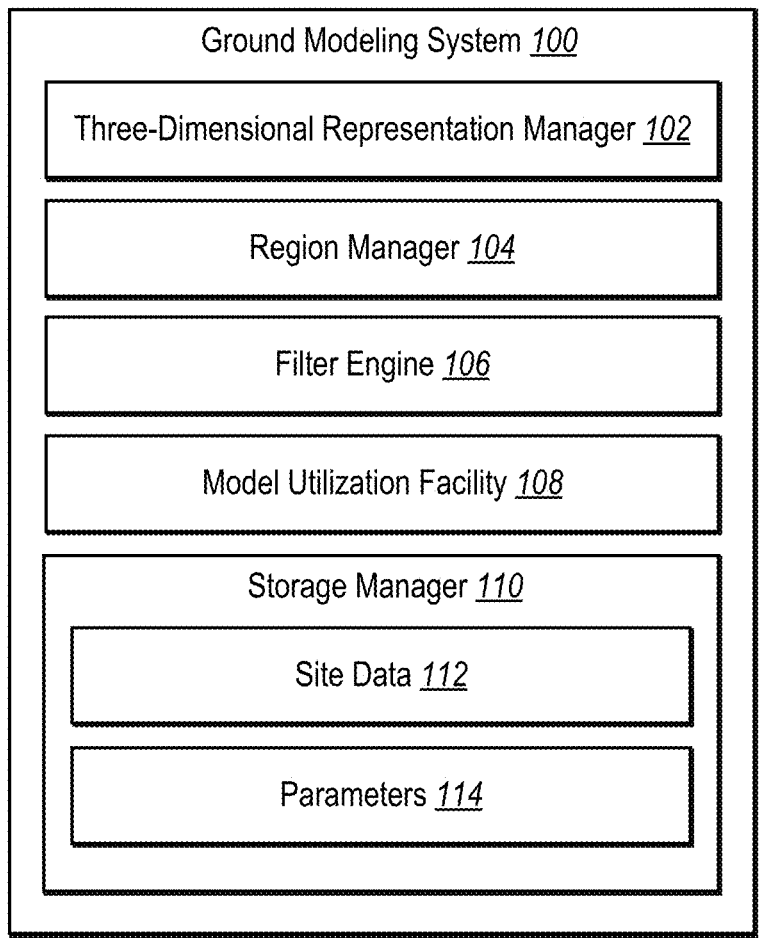
FIG. 1 illustrates a schematic diagram of a ground modeling system in accordance with one or more embodiments.

One or more embodiments of the present disclosure include a ground modeling system and corresponding methods. In particular, in one or more embodiments the ground modeling system filters one or more extraneous objects from a three-dimensional representation of a site. Specifically, the ground modeling system can filter extraneous objects by applying an initial filter, defining regions of the site (e.g., based on the type of terrain), and applying another filter with region specific parameters.

For example, in one or more embodiments, the ground modeling system applies a first filter to a three-dimensional representation of a site utilizing a first set of one or more filter parameters. Then, the ground modeling system defines a first region of the filtered three-dimensional representation corresponding to a first type of terrain (i.e., a first region comprising a subset of points from the filtered three-dimensional representation). In one or more embodiments the ground modeling system generates a final three-dimensional representation by applying a second filter to the first region utilizing a second set of one or more filter parameters that are different from the first set of one or more filter parameters. In addition, the ground modeling system can present the final three-dimensional representation for display.

By applying multiple filters, in one or more embodiments the ground modeling system can more accurately remove non-ground points from a three-dimensional representation of a site. In particular, the ground modeling system can apply an initial filter to remove some non-ground points. Moreover, utilizing the initially filtered, three-dimensional representation, the ground modeling system can more easily identify regions corresponding to particular types of terrain. Then, the ground modeling system can apply additional filters to the identified regions utilizing region specific parameters suited to the particular types of terrain.

More specifically, one or more embodiments of the ground modeling system apply an initial morphological filter to a three-dimensional representation of a site. Specifically, one or more embodiments apply an initial erosion operation and an initial dilation operation to a three-dimensional representation utilizing a minimum filter radius. The erosion operation and dilation operation can assist the ground modeling system in identifying initial points to remove from the three-dimensional representation.

More specifically, one or more embodiments of the ground modeling system identify points to remove from the three-dimensional representation based on the height of one or more points after application of an erosion operation and dilation operation. For instance, one or more embodiments calculate a difference in height in one or more points in a three-dimensional representation resulting from an erosion operation and dilation operation and compare the difference to one or more filter height thresholds. For instance, the ground modeling system can calculate a change in height between original points in a three-dimensional point cloud and dilated points after application of an erosion operation and dilation operation. In one or more embodiments, if the change in height is greater than a filter height threshold, the ground modeling system removes the points from the three-dimensional representation.

Moreover, one or more embodiments of the ground modeling system utilize an auxiliary threshold to remove non-ground points while reducing the risk of over-removal. In particular, one or more embodiments of the ground modeling system apply an auxiliary threshold to preserve points in a three-dimensional representation (even where those points may otherwise be removed by application of a filter height threshold). By applying an auxiliary threshold, one or more embodiments of the ground modeling system reduce the risk of over-filtering points from three-dimensional representations.

In addition, after initial application of an erosion operation and dilation operation, one or more embodiments of the ground modeling system utilize a clustering algorithm to further distinguish ground points from non-ground points in a three-dimensional representation. For example, one or more embodiments of the ground modeling system apply a clustering algorithm that divides the three-dimensional representation into clusters. The ground modeling system can identify non-ground points by comparing the resulting clusters. For instance, in one or more embodiments, the ground modeling system identifies non-ground points by comparing the size of the resulting clusters, and removing smaller clusters (i.e., removing small clusters in a three-dimensional representation that tend to reflect non-ground points). In this manner, the ground modeling system can create an initially filtered three-dimensional model.

Moreover, as discussed previously, after applying an initial filter, one or more embodiments of the ground modeling system create regions in a three-dimensional representation. For example, in one or more embodiments, the ground modeling system builds regions by comparing the height of neighboring points in a three-dimensional representation. For instance, the ground modeling system can create a region by comparing a first point in a region to a neighboring point and adding the neighboring point to the region when the neighboring point falls within a pre-defined height difference relative to the first point. Thus, the ground modeling system can traverse points in a three-dimensional representation and build regions based on the relative height distance of neighboring points in the region.

The ground modeling system can also expand regions. For example, in some circumstances building a region based on the relative height distance of neighboring points can leave undefined points within a boundary of a region. Accordingly, in one or more embodiments, the ground modeling system expands regions to include undefined points contained within a region boundary.

Similarly, in one or more embodiments the ground modeling system can also detect region borders (i.e., the areas surrounding one or more regions). In particular, the ground modeling system can apply a clustering algorithm to identify areas around a region that are connected in a Euclidean sense. Moreover, the ground modeling system can limit the resulting clusters to areas within a certain distance of region boundaries to identify region borders.

In addition to creating regions (and region borders), one or more embodiments of the ground modeling system identify types of terrain corresponding to created regions. For example, the ground modeling system can identify a type of terrain corresponding to a region by comparing the height of neighboring points in the region and building a histogram of the height differences. For example, as outlined in greater detail below, the ground modeling system can compare the histogram of height differences to one or more terrain patterns to determine a type of terrain corresponding to the region. Thus, for example, the ground modeling system can analyze a histogram with a large percentage of small height differences and determine that the histogram indicates a flat terrain.

As mentioned above, after building regions (and/or identifying a type of terrain corresponding to the regions), one or more embodiments of the ground modeling system apply one or more additional filters to the three-dimensional representation. In particular, the ground modeling system can apply additional morphological filters to the three-dimensional representation. Thus, as discussed above with regard to the initial filter, the ground modeling system can apply an erosion operation and a dilation operation, compare height differences in the three-dimensional representation before and after application of the operation and dilation operation, remove or modify points based on the height differences, apply a clustering algorithm, and remove points based on the resulting clusters.

Notably, the ground modeling system can apply an additional filter utilizing modified parameters (e.g., parameters different from the initial filter). In particular, the ground modeling system can apply an additional filter utilizing parameters specific to particular types of terrain associated with identified regions. For example, where the ground modeling system identifies a region corresponding to a flat terrain, the ground modeling system can apply parameters specific to a flat terrain. For instance, in such circumstances, the ground modeling system can modify (e.g., enlarge) a filter radius applicable to the erosion operation and dilation operation. Similarly, the ground modeling system can modify (e.g., decrease) the size of a filter height threshold utilized to remove or modify points in a three-dimensional representation.

In addition, in one or more embodiments, the ground modeling system can also apply other filters to more accurately distinguish ground from non-ground points. In particular, in one or more embodiments, the ground modeling system can user a color filter to remove non-ground points. For example, in one or more embodiments, the ground modeling system utilize a color-based morphological filter to further remove any remaining vegetation reflected in a three-dimensional representation.

As used herein, the term "three-dimensional representation" refers to any digital data depicting a three-dimensional object or site. The term three-dimensional representation includes a three-dimensional point cloud, a three-dimensional mesh, a three-dimensional surface, a plurality of points in a three-dimensional plane derived from the observation of a feature or landmark from a single or multiple views, other three-dimensional digital data.

As used herein, the term "point cloud" refers to a set of digital data points in a coordinate system. In particular, the term point cloud may refer to a set of digital data points on a three-dimensional coordinate system. For instance, a point cloud may refer to the set of data points on a three-dimensional coordinate system that represent the external surface of one or more objects. More specifically, a point cloud may refer to the set of data points on a three-dimensional coordinate system that represent a particular location, including but not limited to, a construction site, a building, a mine, and/or some other three-dimensional object or site.

As used herein, the term "filter" refers to a digital process that distinguishes between two or more digital points in a three-dimensional representation. Accordingly, a "filter" includes a digital process that removes, replaces, or modifies one or more digital points in a three-dimensional representation. For instance, the term "filter" includes a morphological filter, an erosion operation, a dilation operation, a cluster operation (e.g., a cluster operation where clusters are identified and utilized to remove one or more digital points), or a color filter (e.g., a morphological color filter).

The term "filter parameters" refers to a factor that sets a condition for operation of a filter. In particular, the term filter parameter includes a variable factor that sets a condition applicable to operation of a filter. For example, filter parameters may include a filter radius (e.g., a filter window applicable to an erosion operation and/or dilation operation), a height value threshold (e.g., a height value threshold utilized after application of an erosion operation and/or dilation operation to remove or modify digital points), an auxiliary threshold (e.g., an auxiliary threshold utilized after application of an erosion operation and/or dilation operation to remove or modify digital points), or a color parameter (e.g., a parameter identifying a range or difference in colors with regard to applying a color filter).

Turning now to FIG. 1, additional detail will be provided regarding components and capabilities of one or more embodiments of the ground modeling system. In particular, FIG. 1 shows a schematic diagram illustrating an example embodiment of a ground modeling system 100. As shown in FIG. 1, in one or more embodiments, the ground modeling system 100 comprises a three-dimensional representation manager 102, a region manager 104, a filter engine 106, a model utilization facility 108, and a storage manager 110. Moreover, the storage manager 110 may store and/or otherwise manage data representative of site data 112 and parameters 114.

As illustrated in FIG. 1, the ground modeling system 100 may include the three-dimensional representation manager 102. In one or more embodiments, the three-dimensional representation manager 102 generates, builds, creates, accesses, retrieves, modifies, or provides one or more three-dimensional representations. In particular, the three-dimensional representation manager 102 can generate a three-dimensional representation of a site.

The three-dimensional representation manager 102 can access or generate three-dimensional representations from any available source. For instance, the three-dimensional representation manager 102 can access a plurality of aerial images of a site and, based on the plurality of aerial images, generate a three-dimensional representation of the site. Additional or alternatively, the three-dimensional representation manager 102 can access an existing three-dimensional representation for utilization by the ground modeling system 100.

The three-dimensional manager 102 can also include means for capturing aerial images, survey points, surface projections, or other data utilized to generate one or more three-dimensional representations. For example, the three-dimensional manager 102 can include a camera attached to a UAV utilized to capture one or more aerial images of a site.

As FIG. 1 illustrates, the ground modeling system 100 may also include the region manager 104. The region manager 104 defines, builds, identifies, generates, calculates, creates, expands, grows, or modifies one or more regions. Moreover, the region manager 104 can analyze, identify, classify, or define one or more regions. In particular, the region manager 104 can create a region from points of a three-dimensional representation of a site. Moreover, the region manager 104 can identify a type of terrain corresponding to a region created from a three-dimensional representation of a site.

In one or more embodiments, the region manager 104 builds a region by identifying a difference in height between two or more points in a three-dimensional representation. Specifically, in one or more embodiments, the region manager 104 selects a first point from a three-dimensional representation to include in a region and compares the height of the first point to one or more neighboring points in a three-dimensional representation. The region manager 104 can determine the difference in height between the first point and the one or more neighboring points. Based on the difference, the region manager 104 can determine whether the one or more neighboring points should be added to the region.

For instance, in one or more embodiments, the region manager 104 builds a region by comparing the height difference between two or more points to a pre-determined height value. For example, in one or more embodiments, if a difference in height between a first point in a region and a neighboring point is greater than 0.5 cm, the region manager 104 will not add the neighboring point to the region. Alternatively, if a difference in height between a first point in a region and a neighboring point is less than 0.5 cm, the region manager 104 will add the neighboring point to the region.

In one or more embodiments, the region manager 104 continues to analyze points to identify additional points to add to a region. For example, if the region manager 104 analyzes the difference in height between a first point and a neighboring point, and adds the neighboring point to the region, the region manager 104 can compare the neighboring point to its neighbors to identify additional points to add the region. In this manner, the region manager 104 can traverse the points in a point cloud to create one or more regions.

In one or more embodiments, the region manager 104 will only create a region once the size (e.g., the number of points in a proposed region) exceeds a minimum size. Thus, for example, in one or more embodiments, if the number of points does not exceed five-hundred, the region manager 104 will not create a region.

The region manager 104 can also classify or identify a type of terrain corresponding to a region. In particular, in one or more embodiments the region manager 104 defines regions corresponding to a type of terrain. For example, the region manager 104 can determine that a region corresponds to a flat terrain, a moderately sloped terrain, a steep terrain, or some other terrain (e.g., hilly, mountainous).

In one or more embodiments, the region manager 104 identifies a type of terrain corresponding to a region based on differences in height between neighboring points in the region. In particular, the region manager 104 can generate a histogram of heights differences between neighboring points in a region. Specifically, the region manager 104 can identify height difference ranges and generate a histogram by identifying the number (or percentage) of height difference between neighboring points in a region that fall within the identified height difference ranges.

Furthermore, in one or more embodiments the region manager 104 utilizes a generated histogram to identify a type of terrain corresponding to a region. For instance, the region manager 104 can compare a histogram to a terrain pattern to identify a type of terrain corresponding to the region. For example, in one or more embodiments the region manager 104 can identify a certain type of terrain (e.g., a flat terrain) corresponding to a region when the following height pattern is satisfied: more than 50% of the differences in height for a region fall within the height range of 0-1 cm. The region manager 104 can compare a histogram of a region to a terrain pattern, and, based on the comparison, identify a type of terrain corresponding to the region.

Aside from building a region and identifying a type of terrain corresponding to the region, the region manager 104 can also expand a region. For example, in one or more embodiments, the region manager 104 can expand a region to absorb small objects contained within a region boundary. In particular, the region manager 104 can define a region boundary, identify points within the region that have not been added to the region, and expand the region by adding the points within the region that have not been added. More specifically, the region manager 104 can analyze each point within a region (e.g., within a region boundary) and identify any neighboring points that the region manager 104 has not included in a region. In one or more embodiments, the region manager 104 expands the region by adding the identified neighboring points to the region.

Similarly, in one or more embodiments, the region manager 104 can also identify one or more region borders. Region borders are areas outside of and adjacent to one or more region boundaries. In some circumstances, region borders may not be assigned to a region. For example, region boundaries may have points that differ in height from immediately neighboring points but are not large enough to generate an independent region. To accurately account for such areas, the region manager 104 can identify region borders.

For example, in one or more embodiments, the region manager 104 utilizes a clustering algorithm with regard to points outside of a region boundary. In particular, the clustering algorithm identifies one or more clusters based on the location of points outside of the region boundary. If an identified cluster exceeds a certain size (e.g., more than 500 points), the region manager 104 can identify the cluster as a region boundary. In some embodiments, the region manager 104 limits the size of a region boundary (e.g., to points outside the region border but within 1.5 m of the region border).

The region manager 104 can also emphasize or prioritize one or more regions. In particular, the region manager 104 can emphasize or prioritize regions based on a type of terrain. For example, in one or more embodiments the region manager 104 traverses a three-dimensional representation and analyzes all regions corresponding to a particular type of terrain before analyzing other regions. For example, in one or more embodiments, the region manager 104 first identifies all regions corresponding to a flat terrain type, expands the regions corresponding to a flat terrain type, and identifies all region borders for regions corresponding to a flat terrain type. Thereafter, the region manager 104 identifies one or more other regions, expands the one or more other regions, and identifies one or more other region borders.

As illustrated in FIG. 1, the ground modeling system 100 may also include the filter engine 106. The filter engine 106 can apply one or more filters. In particular, the filter engine 106 can apply one or more filters to three-dimensional representations. For example, the filter engine 106 can apply one or more filters to three-dimensional representations to distinguish ground points and non-ground points reflected in the three-dimensional representations. The filter engine 106, can apply any type of filter discussed herein, including, but not limited to, morphological filters and color-based morphological filters.

As mentioned above, in one or more embodiments the filter engine 106 can apply an initial filter with an initial set of parameters. In particular, the filter engine 106 can apply a filter to a three-dimensional representation prior to identifying one or more regions (e.g., prior to identifying regions via the region manager 104). For example, in one or more embodiments, the filter engine 106 applies a filter that removes data points (e.g., non-ground points) from a three-dimensional representation to assist in identifying one or more regions.

For example, in one or more embodiments, the filter engine 106 applies an initial morphological filter to a three-dimensional representation. In particular, in one or more embodiments, the filter engine 106 applies an erosion operation, applies a dilation operation, removes or modifies points based on a comparison between a three-dimensional representation and a dilated three-dimensional representation, applies a clustering algorithm, and removes points based on an analysis of the resulting clusters.

As just mentioned, in one or more embodiments the filter engine 106 applies an erosion operation and a dilation operation. An erosion operation is a process operation that changes a value of a point based on the maximum value of all points within a filter radius. For instance, an erosion operation can replace a point with the minimum value of all points within a filter radius. Conversely, a dilation operation is a process operation that changes a value of a point based on the maximum value of all points within a filter radius. For example, a dilation operation can replace a point with the maximum value of all points within a filter radius.

By applying an erosion operation and a dilation operation, the filter engine 106 can identify and/or remove non-ground objects. In particular, the filter engine 106 can identify and/or remove a point in a three-dimensional representation reflecting non-ground objects by comparing the height of the point to the same point after application of an erosion and dilation operation. In one or more embodiments, if the difference in height between the point and the dilated point is greater than a filter height threshold, the filter engine 106 removes the point from the three-dimensional representation. Alternatively, if the difference in height between the point and the dilated point is smaller than a filter height threshold, the filter engine 106 can retain the point from the three-dimensional representation. In this manner, the filter engine 106 can remove one or more non-ground control points utilizing an initial filter.

In addition to applying a filter height threshold, the filter engine 106 can also apply one or more auxiliary thresholds. In particular, the filter engine 106 can determine that a difference in height between a point and a corresponding dilated point is greater than a filter height threshold but less than an auxiliary threshold. In one or more embodiments, upon determining that the difference in height is greater than a filter height threshold but less than an auxiliary threshold, the filter engine 106 can modify the point based on the dilated point (rather than removing or deleting the point). In particular, as outlined in greater detail below, in one or more embodiments, upon determining that the difference in height is greater than a filter height threshold but less than an auxiliary threshold the filter engine 106 replaces the point with the dilated point.

The filter engine 106 can also determine that a difference in height between a point and a corresponding dilated point is greater than both a filter height threshold and an auxiliary height threshold. In such circumstances, one or more embodiments of the filter engine 106 will remove the point from the three-dimensional representation. In this manner, the filter engine 106 can remove one or more points reflecting non-ground objects based on an erosion operation (applying a filter radius), a dilation operation (applying a filter radius), a filter height threshold, and an auxiliary threshold.

The filter engine 106 can determine a filter height threshold and an auxiliary threshold based on a variety of factors, including for example, resolution of a point cloud, features of a site, height differences within a site, a type of terrain, or other factors. Moreover, in one or more embodiments, the filter engine 106 determines the auxiliary threshold based on the magnitude of the filter height threshold. For instance, in one or more embodiments, the filter engine 106 sets the auxiliary threshold as a multiple of the filter height threshold (e.g. 1.5 time the filter height threshold).

As described above, the filter radius is a filter parameter utilized in conjunction with application of an erosion operation and/or dilation operation. In one or more embodiments, the filter engine 106 can select or modify the filter radius. In particular, the filter engine 106 can select or modify the filter radius based on the resolution of a three-dimensional representation, based on a type of terrain, based on features of a site, or based on some other factor.

For example, the filter engine 106 can calculate, estimate, or compute the resolution or density of a three-dimensional representation (e.g., the number of data points present in the three-dimensional representation per a unit of area or volume). In one or more embodiments, the filter engine 106 selects a filter radius based on the computed resolution of a three-dimensional representation. For example, in one or more embodiments the filter engine 106 applies an initial erosion operation and an initial dilation operation to a three-dimensional representation utilizing a minimum filter radius based on the resolution of the three-dimensional representation. Specifically, the filter engine 106 can set a filter radius based on the resolution such that the filter radius will (on average) encompass at least five data points in a point cloud.

As discussed previously, the filter engine 106 can also apply one or more clustering algorithms. In particular, the filter engine 106 can apply a clustering algorithm to generate clusters within a three-dimensional representation of a site. For example, in one or more embodiments, the filter engine 106 applies a Euclidian clustering algorithm to generate clusters of points in a three-dimensional representation that are in close proximity to each other.

In particular, upon removal of one or more points based on application of an erosion operation and dilation operation, the filter engine 106 can apply a Euclidian clustering algorithm that clusters points in a three-dimensional representation based on physical proximity. In this manner, the filter engine 106 can group points into clusters of ground points and non-ground points. Moreover, the filter engine 106 can distinguish between clusters of ground points and non-ground points.

Specifically, in one or more embodiments, the filter engine 106 distinguishes between clusters of ground points and non-ground points based on the size of generated clusters. For example, in one or more embodiments, the filter engine 106 can identify one or more non-grounds points by identifying points that belong to a cluster of smaller size relative to the size of one or more other clusters. Indeed, in at least one embodiment, the filter engine 106 removes points corresponding to clusters that are smaller than a certain percentage of the largest identified cluster (e.g., removes clusters that are less than 15% of the size of the largest identified cluster).

By applying an erosion operation, applying a dilation operation, comparing points to dilated points, applying a clustering algorithm, and removing one or more points based on the resulting clusters, the filter engine 106 can apply an initial filter to a three-dimensional representation. Indeed, as discussed previously (i.e., in conjunction with region manager 104) the ground modeling system 100 can utilize a three-dimensional representation that has passed through such an initial filter to identify regions. Application of an initial filter by the filter engine 106 can assist in removing an initial round of non-ground control points with less aggressive filter parameters, so that the ground modeling system 100 (e.g., the region manager 104) can more easily identify regions and apply a filter with more specific parameters to each resulting region.

Thus, in addition to applying one or more initial filters, the filter engine 106 can also apply additional filters. In particular, in one or more embodiments, the filter engine 106 can apply one or more filters to regions of a three-dimensional representation (e.g., regions created and identified by the region manager 104). For example, the filter engine 106 can identify parameters more suited to particular regions, and apply the region specific parameters to the particular regions to more accurately differentiate between ground and non-ground points.

For instance, upon identifying a particular type of terrain corresponding to a region (e.g., from the region manager 104), the filter engine 106 can identify parameters suited to the type of terrain, and apply another filter to the region based on the identified parameters. For example, if the region manager 104 identifies a region with a flat type of terrain (e.g., a terrain with little height difference between points), the filter engine can identify parameters more suited to a flat type of terrain. For instance, the region manager 104 can apply a modified filter radius a modified filter height threshold, and/or a modified auxiliary threshold. More specifically, the filter engine 106 can apply an erosion operation utilizing a modified filter radius, apply a dilation operation utilizing a modified filter radius, remove points based on a modified filter height threshold and/or auxiliary threshold, apply a cluster algorithm, and/or remove points from the region based on size differences in the resulting clusters.

In addition, the filter engine 106 can apply filters of varying parameters to multiple regions corresponding to multiple different types of terrain. Thus, for example, in addition to applying a filter with a first filter radius and a first filter height threshold to a region corresponding to a flat terrain type, the filter engine 106 can apply a filter with a second filter radius and/or a second filter height threshold to a region corresponding to another type of terrain (e.g., a region corresponding to a more sloped terrain). In sum, the filter engine 106 can apply filters to each identified region utilizing parameters suited to each particular region and its corresponding type of terrain.

The filter engine 106 can also apply additional filters. For instance, in one or more embodiments the filter engine 106 applies a color filter to a three-dimensional representation. For example, upon application of a filter to a region utilizing region specific parameters, the filter engine 106 can also apply a color filter to identify vegetation, or other non-ground points reflected in a three-dimensional representation. The ground modeling system 100 can also identify (e.g., via the region manager 104) color regions and apply a color filter with region specific parameters based on the identified color regions.

As illustrated in FIG. 1, in addition to the filter engine 106, the ground modeling system 100 may also include the model utilization facility 108. The model utilization facility 108 can generate, create, provide, modify, utilize, analyze, or display information regarding a three-dimensional representation. In particular, the model utilization facility 108 can provide for display information regarding a filtered, three-dimensional representation (e.g., a three-dimensional representation resulting after application of the filter engine 106).

The model utilization facility 108 can create a variety of information regarding one or more three-dimensional representations. For instance, the model utilization facility 108 can provide for display a three-dimensional model with regard to a filtered, three-dimensional representation. Similarly, the model utilization facility 108 can generate and provide for display a table, chart, graph, or other summary with regard to a filtered, three-dimensional representation.

For example, with regard to a mining site, the model utilization facility 108 can generate a model from filtered, three-dimensional representations of the mining site. Moreover, the model utilization facility 108 can provide a summary of material volumes, including an estimate of available mining material. Similarly, with regard to a construction site, the model utilization facility 108 can provide a three-dimensional model from the filtered, three-dimensional representation of the construction site. Engineers can utilize the three-dimensional model to design grading, drainage, or other site improvements. Moreover, the module utilization facility can estimate cut or fill volumes (e.g., amount of earth to import or export) by comparing the three-dimensional model to engineering improvement plans.

In addition to application in mining or construction, the module utilization facility 108 can provide information regarding a filtered, three-dimensional representation with regard to land preservation, real estate, agriculture, land use planning, hydrology, disaster relief, archeology, or other fields or applications.

As illustrated in FIG. 1., the ground modeling system 100 may also include the storage manager 110. The storage manager 110 maintains data for the ground modeling system 100. The storage manager 110 can maintain data of any type, size, or kind, as necessary to perform the functions of the ground modeling system 100.

As illustrated, the storage manager 110 may include site data 112. Site data 112 may include information, data, or images regarding one or more sites. For instance, site data 112 may include a plurality of aerial images of a site (e.g., images utilized by three-dimensional representation manager 102 to generate a three-dimensional representation). Site data 112 may also include information calculated or generated regarding a site (e.g., three-dimensional representations generated by the three-dimensional representation manager 102; regions identified by the region manager 104; filtered point clouds generated by the filter engine 106; or models, tables, or summaries generated by the model utilization facility 108).

In addition, as illustrated in FIG. 1, the storage manager 110 may also include parameters 114. Parameters 114 may include any parameters utilized by the ground modeling system 100, including filter parameters. For instance, parameters 114 may include one or more filter parameters or other parameters. For example, the parameters 114 can include one or more filter radius values, filter height thresholds, auxiliary thresholds, cluster percentage thresholds, histogram ranges, height difference values, region building values, region size thresholds, region border distances, or other parameters.

Moreover, parameters 114 may also include a range of parameters. For instance, parameters 114 may include one or more tables that correlate different parameters to different site features, different elevation changes, or different types of terrain.

Each of the components 102-110 of the ground modeling system 100 and their corresponding elements may be in communication with one another using any suitable communication technologies. It will be recognized that although components 102-110 and their corresponding elements are shown to be separate in FIG. 1, any of components 102-110 and their corresponding elements may be combined into fewer components, such as into a single facility or module, divided into more components, or configured into different components as may serve a particular embodiment. Moreover, one or more embodiments of the ground modeling system 100 may include additional components or fewer components than those illustrated in FIG. 1.

The components 102-110 and their corresponding elements can comprise software, hardware, or both. For example, the components 102-110 and their corresponding elements can comprise one or more instructions stored on a computer-readable storage medium and executable by processors of one or more computing devices. When executed by the one or more processors, the computer-executable instructions of the ground modeling system 100 can one or more devices to perform the methods and functions described herein. Alternatively, the components 102-110 can comprise hardware, such as a special purpose processing device to perform a certain function or group of functions. Additionally or alternatively, the components 102-110 can comprise a combination of computer-executable instructions and hardware.

Furthermore, the components 102-110 of the ground modeling system 100 and their corresponding elements may, for example, be implemented as one or more stand-alone applications, as one or more modules of an application, as one or more plug-ins, as one or more library functions or functions that may be called by other applications, and/or as a cloud-computing model. Thus, the components 102-110 of the ground modeling system 100 and their corresponding elements may be implemented as a stand-alone application, such as a desktop or mobile application. Furthermore, the components 102-110 of the ground modeling system 100 and their corresponding elements may be implemented as one or more web-based applications hosted on a remote server. Alternatively or additionally, the components of the ground modeling system 100 may be implemented in a suit of mobile device applications or "apps."

Figure 2:
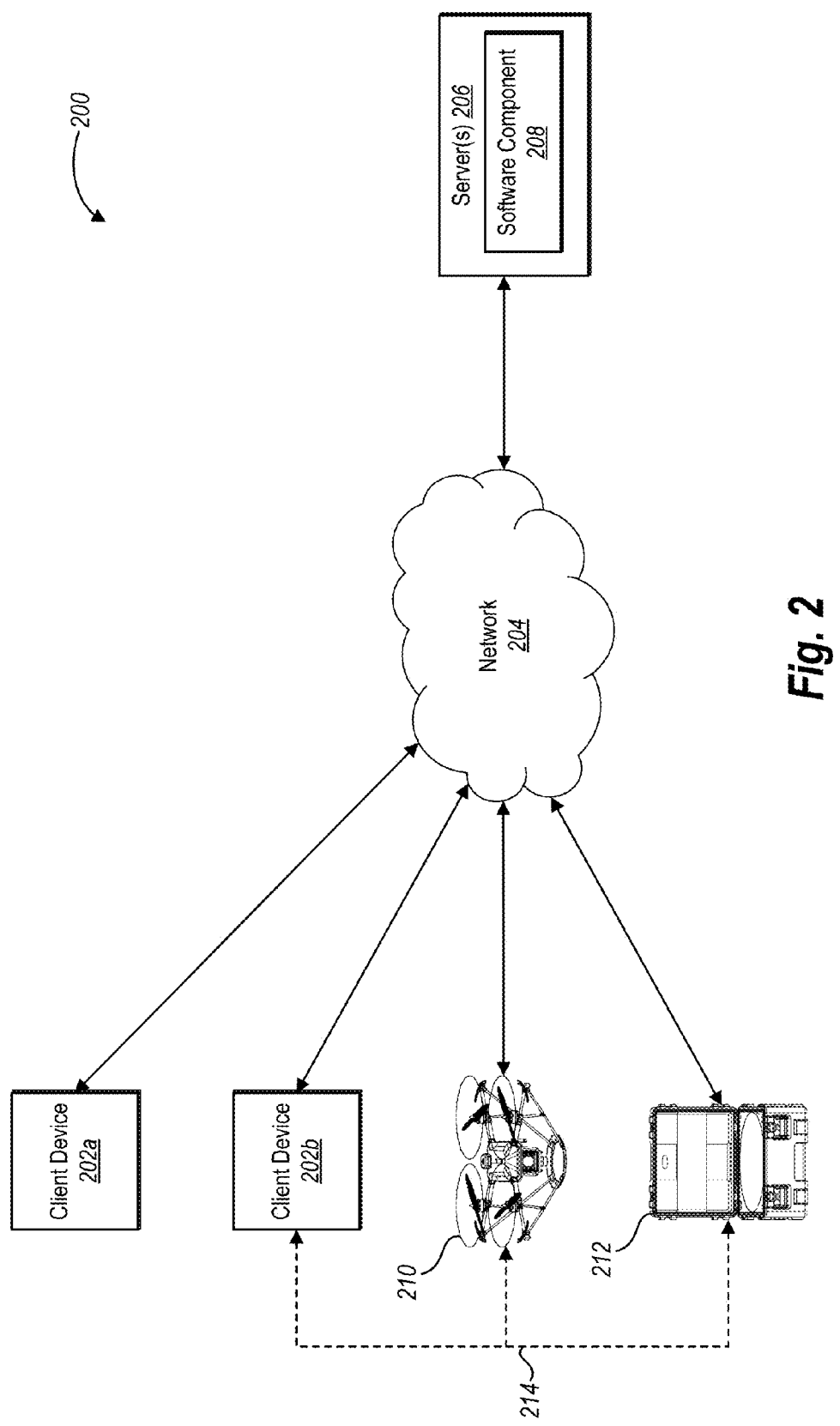
FIG. 2 illustrates a schematic diagram of an exemplary environment for implementing the ground modeling system of FIG. 1 in accordance with one or more embodiments.

Turning now to FIG. 2, further information will be provided regarding implementation of the ground modeling system 100. Specifically, FIG. 2 illustrates a schematic diagram of one embodiment of an exemplary system environment ("system") 200 in which the ground modeling system 100 can operate. As illustrated in FIG. 2, the system 200 can include client devices 202a-202b, a network 204, server(s) 206, a software component 208, a UAV 210, and a landing station 212. The client device 202a-202b, the network 204, the server(s) 206, the software component 208, the UAV 210, and the landing station 212 may be communicatively coupled, as shown in FIG. 2.

The system 200, as illustrated in FIG. 2, may include the client devices 202a-202b. The client devices 202a-202b may comprise any type of computing device. For example, the client devices 202a-202b may comprise one or more personal computers, laptop computers, mobile devices, mobile phones, tablets, special purpose computers, TVs, remote controls, or other computing devices. In particular, in one or more embodiments the client devices 202a-202b may comprise a computing device capable of controlling or otherwise communicating with the UAV 210, the landing station 212, and/or the server(s) 206. Similarly, the client devices 202a-202b may comprise one or more computing devices as discussed in greater detail below with regard to FIG. 9.

As used herein, the term "UAV" or "unmanned aerial vehicle" refers to an aircraft that can be piloted autonomously or remotely by a control system. Accordingly, the UAV 210 may comprise any type of UAV, including micro a UAV, low altitude UAV, or high altitude UAV, whether autonomously or remotely piloted. Similarly, the UAV 210 may include multi-rotor UAVs, single-rotor UAVs, blimp UAVs, or other types of UAVs. In particular, the UAV 210 may include an onboard computer that controls the autonomous flight of the UAV 210. In at least one embodiment, the UAV 210 is a multi-rotor vehicle, such as a quadcopter, and includes a carbon fiber shell, integrated electronics, a battery bay, a global positioning system ("GPS") receiver, a fixed or swappable imaging system (e.g., a digital camera), and various additional sensors and/or receivers. The UAV 210 may contain one or more computer-readable storage media and/or one or more processors with instructions stored thereon that, when executed by the one or more processors cause the UAV 210 to perform functions described herein.

Alternatively or additionally, the system 200 may include the landing station 212. The landing station 212 may be utilized to land, store, charge, guide, or repair the UAV 210. Moreover, the landing station 212 may be utilized to communicate with the UAV 210, the client devices 202a-202b, and/or the server(s) 206 prior to, during, or after a flight. In addition, the landing station 212 may comprise one or more computing devices that perform functions described herein.

As illustrated in FIG. 2, the client devices 202a-202b, the UAV 210, the landing station 212, and/or the server(s) 206 may communicate via the network 204. The network 204 may represent a network or collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the network 204 may be any suitable network over which the client devices 202a-202b (or other components) may access the server(s) 206 or vice versa. The network 204 will be discussed in more detail below with regard to FIG. 9.

The server(s) 206 may generate, store, receive, and transmit any type of data, including site data 112, parameters 114, or electronic communication data. For example, the server(s) 206 may receive data from the client device 202b, and send the data to the UAV 210 or the landing station 212. In one example embodiment, the server(s) 206 is a data server. The server(s) 206 can also comprise a communication server or a web-hosting server. Additional details regarding the server(s) 206 will be discussed below with respect to FIG. 9.

Although FIG. 2 illustrates client devices 202a-202b, the UAV 210, and the landing station 212, it will be appreciated that the client devices 202a-202b, the UAV 210, and the landing station 212 can represent any number of computing devices, UAVs, or landing stations (fewer or greater than shown). Similarly, although FIG. 2 illustrates a particular arrangement of the client devices 202a-202b, the UAV 210, the landing station 212, the network 204, and the server(s) 206, various additional arrangements are possible.

For example, the client device 202b, the UAV 210 and/or the landing station 212 may communicate directly one with another via the local connection 214. The local connection 214 may comprise any recognized form of wired or wireless communication. For example, in one or more embodiments the client device 202b may include a mobile computing device (e.g., tablet) utilized by a UAV operator to communicate with the UAV 210 and the landing station 212 using BLUETOOTH technology.

By way of an additional example, in one or more embodiments a UAV operator utilizes the client device 202b to interact with the UAV 210. The UAV 210 may take a plurality of aerial images of a site based on instruction provided by the client device 202b via local connection 214. The UAV 210 may transmit the plurality of aerial images to the client device 202b (or to the landing station 212), which in turn, may transmit the plurality of aerial images to the server(s) 206 via the network 204 and interaction with the software component 208.

Moreover, a user of client device 202a may send a request to the server(s) 206, utilizing the software component 208, for a three-dimensional representation of the site. The server(s) 206 may calculate a three-dimensional representation of the site (e.g., utilizing three-dimensional representation manager 102) and send the three-dimensional representation to the client device 202a. The client device 202a may apply an initial filter (e.g., utilizing filter engine 106), calculate regions (e.g., utilizing the region manager 104), and apply another filter utilizing region specific parameters (e.g., utilizing the filter engine 106 and parameters 114) to the three-dimensional representation. Moreover, the client device 202a may generate a model of the filtered, three-dimensional representation (e.g., utilizing the model utilization facility 108) and store the model (e.g., utilizing storage manager 110).

Aside from this example, various additional arrangements or implementations are also possible. For instance, the UAV 210, the client device 202b, and/or the landing station 212 could generate one or more three-dimensional representations and/or apply one or more filters. Similarly, the server(s) 206 can generate a filtered, three-dimensional representation and send the filtered, three-dimensional representation to client device 202a, client device 202b, the UAV 210, and/or the landing station 212.

Accordingly, as illustrated in previous examples, the ground modeling system 100 may be implemented in whole, or in part, by the individual elements 202-212 of the system 200. For instance, the ground modeling system 100 may be implemented in its entirety on the UAV 210, the client device 202a, the client device 202b, or some other component. Alternatively or additionally, different components and functions of the ground modeling system 100 may be implemented separately among or across multiple of the client devices 202a-202b, the server(s) 206, the software component 208, the UAV 210, and the landing station 212.

Figure 3A:
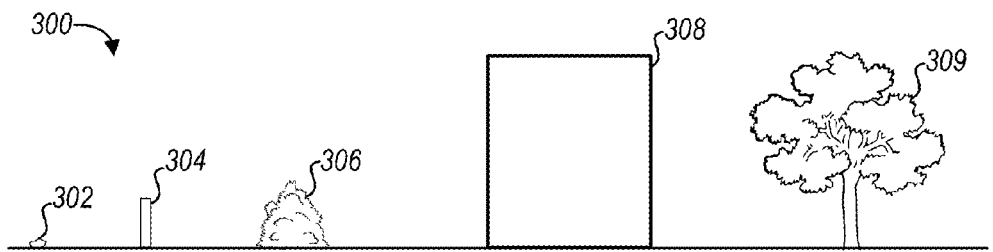
FIG. 3A illustrates a profile of a portion of a site for modeling in accordance with one or more embodiments.

Turning now to FIGS. 3A-3G, additional detail will be provided regarding applying a filter in accordance with one or more embodiments. In particular, FIG. 3A illustrates a representation of a profile 300 of a site (or a portion of a site). The profile 300 illustrates a rock 302, a fence 304 (i.e., non-ground object), a bush 306 (i.e., a non-ground object), a structure 308 (i.e., a non-ground object), and a tree 309 (i.e., a non-ground object). One or more embodiments of the ground modeling system 100 can remove non-ground objects from a three-dimensional representation of a site.

Figure 3B:
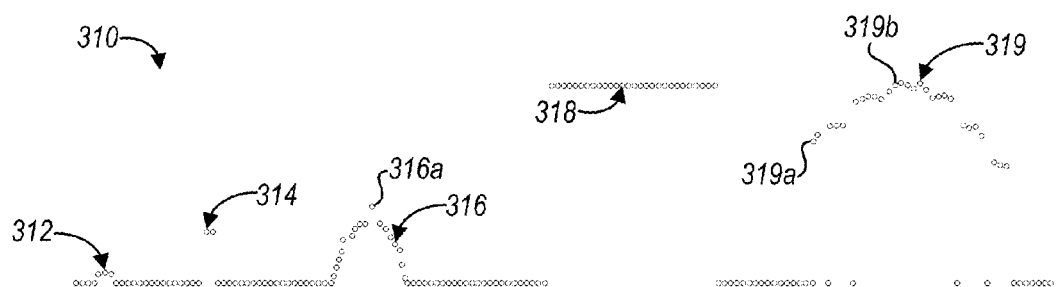
FIG. 3B illustrates a representation of a portion of a three-dimensional point cloud with regard to the site of FIG. 3A generated in accordance with one or more embodiments.

For example, FIG. 3B illustrates a point cloud 310 of the site represented by the profile 300 in FIG. 3A. As discussed previously, one or more embodiments of the ground modeling system 100 can generate a three-dimensional representation of a site. With regard to FIG. 3B, the ground modeling system 100 generates the point cloud 310 from a plurality of images of the site. As illustrated, the point cloud 310 contains a plurality of points, including points reflecting the rock 312, points reflecting the fence 314, points reflecting the bush 316, points reflecting the structure 318, and points reflecting the tree 319.

Figure 3C:
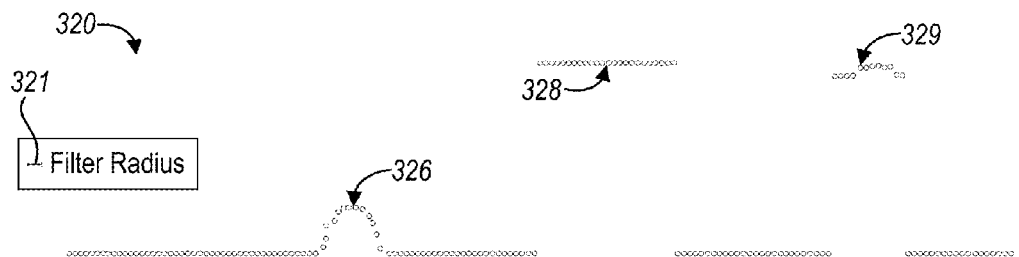
FIG. 3C illustrates a representation of an eroded three-dimensional point cloud in accordance with one or more embodiments.

As described previously, one or more embodiments of the ground modeling system 100 apply an erosion operation. FIG. 3C illustrates a representation of an eroded point cloud 320 upon application of an erosion operation. As mentioned previously, an erosion operation can modify a particular point in a point cloud based on a minimum point falling within a certain distance (i.e., a filter radius) from the particular point. For example, an erosion operation can find the point with the lowest height within 5 cm of a particular point and replace the height of the particular point with the lowest height. Specifically, FIG. 3C illustrates application of an erosion operation to the point cloud 310 that operates by replacing a point (i.e., a point height corresponding to the point) in the point cloud 310 with the minimum point (i.e., the minimum point height) that lies within a filter radius 321 from the point.

For example, with regard to the points reflecting the rock 312, application of an erosion operation utilizing the filter radius 321 results in replacing the height of the points reflecting the rock 312 with the height of points reflecting the surrounding ground. In particular, because lower points reflecting the ground are within the filter radius 321 from all the points reflecting the rock 312, application of an erosion operation, in this embodiment, lowers all the points reflecting the rock 312 to the height of surrounding ground points.

Similarly, with regard to the points reflecting the fence 314, all the points reflecting the fence 314 are horizontally within the filter radius 321 of surrounding ground points. Accordingly, application of an erosion operation, in this embodiment, lowers the points reflecting the fence 314 to the height of surrounding ground points in the eroded point cloud 320.

In addition, with regard to the points reflecting the bush 316, the points reflecting the structure 318, and the points reflecting the tree 319, application of the erosion operation illustrated in FIG. 3C results in eroded points reflecting the bush 326, eroded points reflecting the structure 328, and eroded points reflecting the tree 329. As illustrated, the eroded points generally reflect a smaller (i.e. eroded) version of the objects in the point cloud 310.

Moreover, the eroded points remove (e.g., smooth over) one or more features of objects reflected in the point cloud 310. For example, the erosion operation has lowered many of the points reflecting the tree 319 in generating the eroded points reflecting the tree 329. In doing so, the ground modeling system 100 has more clearly delineated the tree in relation to surrounding points reflecting the ground.

Figure 3D:
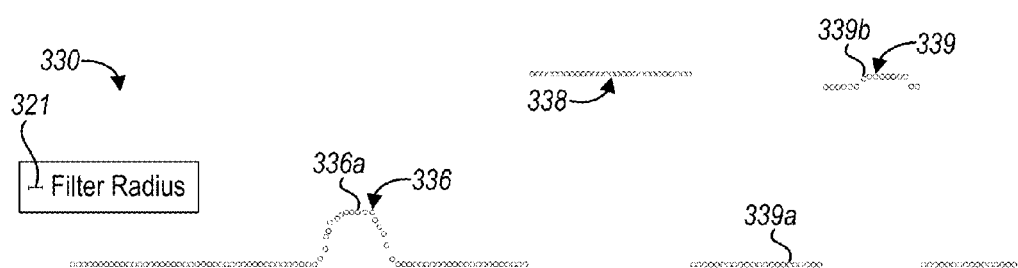
FIG. 3D illustrates a representation of a dilated three-dimensional point cloud in accordance with one or more embodiments.

As discussed previously, aside from applying an erosion operation, one or more embodiments of the ground modeling system 100 also apply a dilation operation. For example, FIG. 3D reflects a dilated point cloud 330 upon application of a dilation operation. As mentioned previously, a dilation operation can modify a particular point in a point cloud based on a maximum point falling within a certain distance (i.e., a filter radius) from the particular point. For example, a dilation operation can find the point with the greatest height within 5 cm of a particular point and replace the height of the particular point with the greatest height. Specifically, FIG. 3D illustrates the dilated point cloud 330 generated from application of a dilation operation to the eroded point cloud 320. In particular, the ground modeling system 100 generates the dilated point cloud 330 by utilizing a dilation operation that replaces a point in the eroded point cloud 320 with the maximum point that lies within the filter radius 321 from the point.

As illustrated in FIG. 3D, application of an erosion operation results in dilated points reflecting the bush 306, dilated points reflecting the structure 308, and dilated points reflecting the tree 309. Notably, however, the dilated point cloud 330 does not include any points reflecting the height of the rock 302 or the height of the fence 304 (i.e., application of the erosion operation and the dilation operation has smoothed out elevation changes attributable to the rock and the fence).

As discussed previously, in one or more embodiments, the ground modeling system 100 can calculate or select the filter radius 321. For instance, in one or more embodiments, the ground modeling system selects the filter radius 321 based on a resolution or density of the point cloud 310. In particular, the ground modeling system 100 can identify the resolution of points (i.e., number of point clouds per unit of area or volume) within the point cloud 310. Based on the resolution, the ground modeling system 100 can select the filter radius 321.

For instance, if the ground modeling system 100 determines that the density of the point cloud 310 is, on average, one point every 5 $cm^2$, in one or more embodiments, the ground modeling system 100 can select a filter radius of 5 cm. In other embodiments, the ground modeling system 100 can select a filter radius that is a pre-determined amount larger (or smaller) than the filter radius (e.g., add 1 cm to the density to make a filter radius of 6 cm). In yet other embodiments, the ground modeling system selects a filter radius that is a multiple of the resolution or density (e.g., double the resolution to make a filter radius of 10 cm). Similarly, the ground modeling system 100 can select the filter radius 321 based on a resolution of the point cloud 310 such that a minimum number of points will be included within the filter radius (e.g., 10 points will appear within a filter radius from a point, on average).

For example, as discussed above, one or more embodiments of the ground modeling system 100 apply an initial filter to more easily define regions in a three-dimensional representation. In such circumstances, the ground modeling system 100 can apply a smaller filter radius. Indeed, in one or more embodiments, the ground modeling system 100 will apply a filter radius that will capture five points (on average) in traversing the three-dimensional representation. Specifically, as shown in FIG. 3D, the filter radius 321 is sized so as to capture approximately five points (e.g., a point and four neighboring points) in applying an erosion operation and dilation operation.

The ground modeling system 100 can select a filter radius based on a variety of other factors. For example, as described in greater detail below, the ground modeling system 100 can select a filter radius based on a type of terrain. Moreover, in one or more embodiments the ground modeling system 100 can select a filter radius based on user input.

Upon application of an erosion operation and dilation operation utilizing a filter radius (or more than one filter radii), in one or more embodiments, the ground modeling system 100 compares one or more points from the point cloud 310 with one or more points from the dilated point cloud 330 to remove or modify one or more points from the point cloud 310. For example, FIG. 3E illustrates a modified point cloud 340 after removing points from the point cloud 310 based on a comparison of the point cloud 310 with the dilated point cloud 330.

Figure 3E:
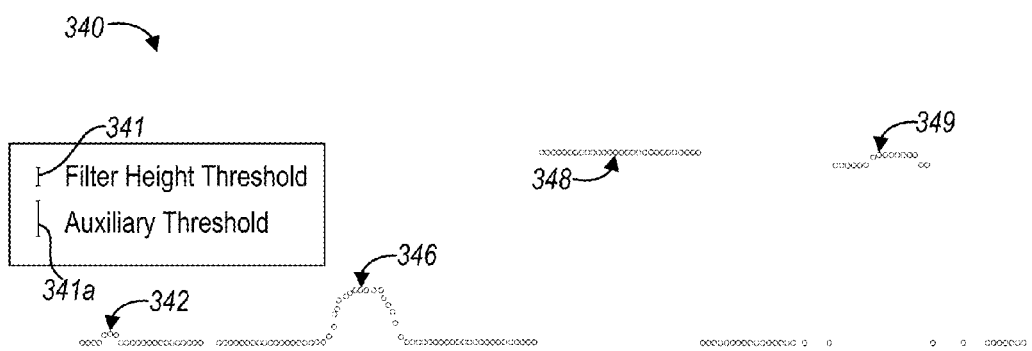
FIG. 3E illustrates a representation of a modified three-dimensional point cloud upon application of a filter height threshold in accordance with one or more embodiments.

In particular, with regard to the embodiment of FIG. 3E, the ground modeling system 100 identifies a difference in height for each point in the point cloud 310 and the corresponding point in the dilated point cloud 330. Moreover, the ground modeling system 100 compares the difference in height to a filter height threshold 341. If the difference in height is less than the filter height threshold 341, then, in one or more embodiments, the ground modeling system 100 leaves the point from the point cloud 310 unchanged. In one or more embodiments, if the difference in height is greater than the filter height threshold 341, the ground modeling system 100 removes the point from the point cloud 310.

In other embodiments, the ground modeling system also compares the difference in height to an auxiliary threshold 341a. Specifically, if the difference in height is greater than the filter height threshold 341, but less than the auxiliary threshold 341a, rather than discarding the point from the point cloud, the ground modeling system 100 replaces the point from the point cloud 310 with the corresponding point from the dilated point cloud 330. If the difference in height is greater than the filter height threshold 341 and greater than the auxiliary threshold 341a, however, in one or more embodiments the ground modeling system 100 removes the point from the point cloud 310. Thus, in one or more embodiments the ground modeling system 100 removes or modifies one or more points from the point cloud 310 according to the following, Pseudo code 1:

if$(H_p - H_{dil}) \leq T$, then $P$ remains if $T > (P - P_{dil}) \leq T_{aux}$, then replace $P$ with $P_{dil}$ if$(P - P_{dil}) > T_{aux}$, then remove $P$ where T is a filter height threshold, $T_{aux}$ is an auxiliary threshold, P is a point in a point cloud, $P_{dil}$ is a point in a dilated point cloud corresponding to point P, $H_p$ is a height value of P, and $H_{dil}$ is a height value of $P_{dil}$.

It will be appreciated that other embodiments of the ground modeling system 100 can apply filter height thresholds and/or auxiliary thresholds to points in the point cloud 310 according to different models or patterns. For instance, in some embodiments, if $(H_p - H_{dil}) = T$ then the ground modeling system replaces the point P with the point $P_{dil}$ (rather than leaving P unchanged, as shown above). Similarly, rather than replacing P with $P_{dil}$, other embodiments of the ground modeling system 100 apply some other modification to P (e.g., average the height of P and $P_{dil}$).

With regard to FIG. 3E, the ground modeling system 100 applies the filter height threshold 341 and the auxiliary threshold 341a as described with regard to Pseudo code 1 to produce the modified point cloud 340. As illustrated, the modified point cloud 340 includes points reflecting the rock 342, points reflecting the bush 346, points reflecting the structure 348, and points reflecting the trees 349.

For instance, with regard to the points reflecting the rock 342, the ground modeling system 100 compares the height of the points reflecting the rock 312 in the point cloud 310 with corresponding points in the dilated point cloud 330 (i.e., points that were largely lowered based on the height of surrounding ground points). Because the difference in height between the points reflecting the rock 312 and the corresponding points in the dilated point cloud 330 are less than the filter height threshold 341, the ground modeling system 100 leaves the points reflecting the rock 312 from the point cloud 310 unchanged as the points reflecting the rock 342 in the modified point cloud 340.

Similarly, referring to the points reflecting the fence 304, the ground modeling system 100 compares the height of the points reflecting the fence 304 in the point cloud 310 with corresponding points in the dilated point cloud 330 (i.e., points that were largely lowered to the height of surrounding ground points in the erosion operation and dilation operation), and determines that the difference in height is greater than the filter height threshold and the auxiliary threshold. Accordingly, the ground modeling system 100 replaces the points reflecting the fence 304 in the point cloud 310 with corresponding points in the dilated point cloud 330 in generating the modified point cloud 340.

Moreover, with regard to the points reflecting the bush 346, the ground modeling system 100 compares the height of the points reflecting the bush 316 in the point cloud 310 with dilated points reflecting the bush 336 in the dilated point cloud 330. The ground modeling system 100 determines that the difference in height for most points is less than the filter height threshold 341, and leaves the points unchanged from the point cloud 310. However, the difference in height between point 316a in the point cloud 310 and the corresponding dilated point 336a in the dilated point cloud 330 is greater than the filter height threshold 341 but less than the auxiliary threshold 341a. Accordingly, as illustrated, the ground modeling system 100 replaces the point 316a with the dilated point 336a in the modified point cloud 340.

Furthermore, as illustrated in FIGS. 3B and 3D, the points reflecting the structure 318 in the point cloud 310 are largely the same as dilated points reflecting the structure 338 in the dilated point cloud 330. Accordingly, the ground modeling system 100 leaves the points reflecting the structure 318 unchanged in the modified point cloud 340.

In addition, the ground modeling system 100 performs a similar analysis with regard to the points reflecting the tree 349. Specifically, the ground modeling system 100 compares the height of the points reflecting the tree 319 and the dilated points reflecting the tree 339, and identifies some points with differences in height that do not exceed the filter height threshold 341 and other points with differences that exceed the auxiliary threshold 341a. Specifically, the difference in height between point 319a from the point cloud 310 and dilated point 339a from the dilated point cloud 330 exceeds the auxiliary threshold 341a, and the difference in height between point 319b from the point cloud 310 and dilated point 339b from the dilated point cloud 330 is smaller than the filter height threshold 341. The ground modeling system 100 removes points where the difference in height exceeds the auxiliary threshold 341a (e.g., removes point 319a in generating the modified point cloud 340). Moreover, the ground modeling system 100 leaves points unchanged where the difference in height is less than the filter height threshold 341 (e.g., leaves the point 319b unchanged in generating the modified point cloud 340).

The ground modeling system 100 can select the filter height threshold 341 based on a variety of factors. For example, the ground modeling system 100 can select the filter height threshold based on resolution of a three-dimensional representation, features of a site (or three-dimensional model of a site), a type of terrain, or user input.

For instance, one or more embodiments of the ground modeling system 100 selects the filter threshold 341 based on an analysis of a site (e.g., analysis of a three-dimensional model of the site). In particular, one or more embodiments of the ground modeling system 100 analyze a three-dimensional representation to determine an amount of elevation change associated with the site. For example, in one or more embodiments, the ground modeling system 100 determines the average difference in height between points in a point cloud and neighboring points. In one or more embodiments, the ground modeling system 100 identifies the filter height threshold 341 based on this average difference in height. Indeed, in one or more embodiments, the ground modeling system 100 sets the filter height threshold 341 as a multiplier of the average difference in height (e.g., 5 times the average difference in height).

Rather than calculating an average difference in height, other embodiments of the ground modeling system 100 can base the filter height threshold 341 on other calculated values. For example, the ground modeling system 100 can base the filter height threshold 341 on a minimum and maximum height value (e.g., the difference in height between the highest point in the point cloud 310 and the lowest point in the point cloud 310), based on a median height difference between points in the point cloud 310, or based on similar values (average, median, etc.) calculated from the dilated point cloud 330.

In addition, the ground modeling system 100 can also select the filter height threshold based on a type of filter or type of terrain. For example, where the ground modeling system applies an initial filter (e.g., to more easily identify a region), the ground modeling system 100 may apply a different (e.g., larger) value for the filter height threshold 341 to avoid over-filtering. Similarly, where the ground modeling system 100 applies filter with region specific parameters, the ground modeling system 100 may apply a different (e.g., smaller) filter height threshold.

In one or more embodiments, the filter height threshold 341 is selected from a range. For example, in some embodiments the filter height threshold 341 may fall between 0.2 and 0.5 m. The ground modeling system 100 can identify the range based on features of the site (as discussed previously), based on user input, or some other factor.

Moreover, as discussed above, one or more embodiments of the ground modeling system 100 apply the auxiliary threshold 341a in addition to the filter height threshold 341. In one or more embodiments, the ground modeling system 100 calculates the auxiliary threshold 341a based on the filter height threshold 341. For instance, in one or more embodiments the ground modeling system calculates the auxiliary threshold 341a as a multiple of the filter height threshold 341 (e.g., 1.5 times the filter height threshold). In other embodiments, the ground modeling system 100 generates the auxiliary threshold 341a by adding a certain amount to the filter height threshold 341 (e.g., is 0.1 m higher than the filter height threshold). In yet other embodiments, the ground modeling system 100 generates the auxiliary threshold 341a independent of the filter height threshold and based on other factors (e.g., any of the factors discussed above with regard to the filter height threshold).

As illustrated in FIG. 3E, the ground modeling system 100 can produce the modified point cloud 340. In particular, in generating the modified point cloud 340 the ground modeling system 100 removes some non-ground control points (e.g., points reflecting the fence 304). Moreover, the ground modeling system 100 removes some points and more clearly delineates the difference between objects. For example, the ground modeling system 100 removes point 319a, making the tree more distinct (in a spatial sense) from other points in the modified point cloud 340. By removing such points, the ground modeling system 100 can more easily cluster points in the modified point cloud 340 and further distinguish ground points from non-ground points.

Figure 3F:
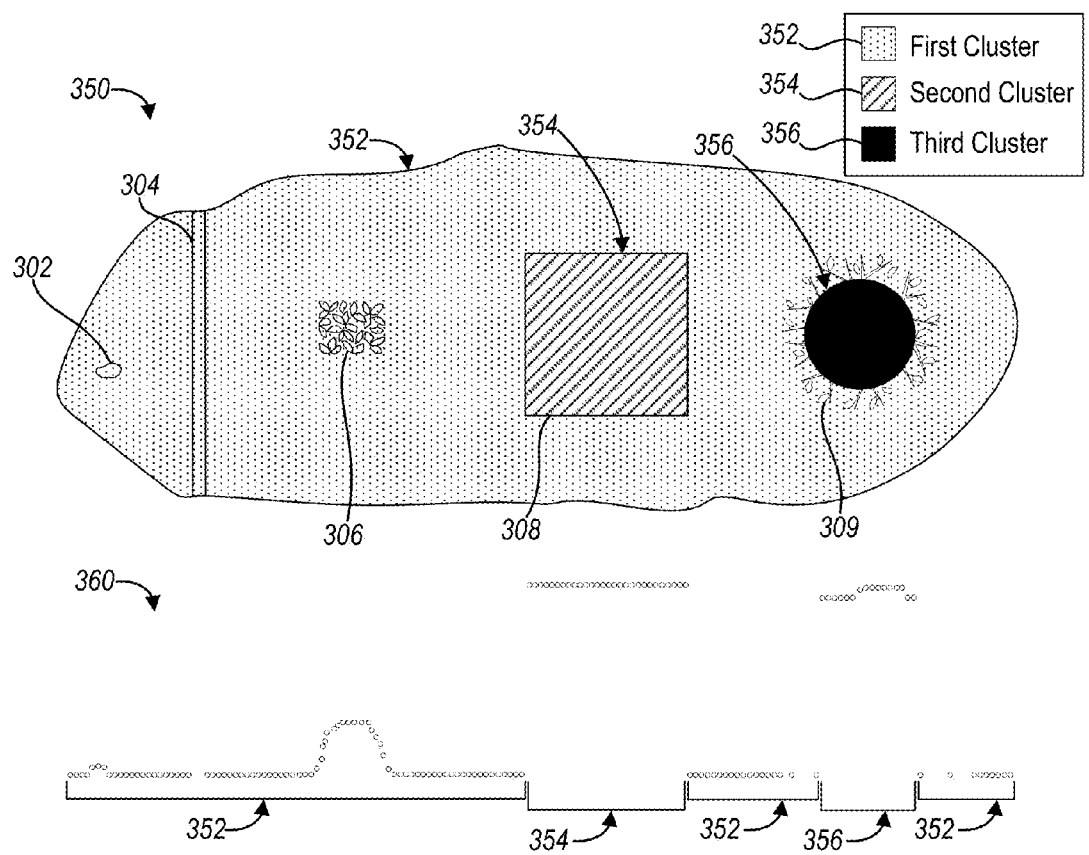
FIG. 3F illustrates a representation of clustering the modified three-dimensional point cloud of FIG. 3E in accordance with one or more embodiments.

Indeed, as discussed above, in one or more embodiments the ground modeling system 100 applies a clustering algorithm to identify clusters in a three-dimensional model. For example, FIG. 3F illustrates clustering a three-dimensional model in accordance with one or more embodiments. Specifically, FIG. 3F illustrates an aerial view 350 of a site, and a representation of a clustered point cloud 360 in accordance with one or more embodiments. The aerial view 350 of the site is an unfiltered aerial image of the site while the clustered point cloud 360 reflects points from the modified point cloud 340.

With regard to the embodiment of FIG. 3F, the ground modeling system 100 applies a Euclidean clustering algorithm to distinguish ground points from non-ground points. A Euclidean clustering algorithm identifies clusters (i.e., similar groups of points) based on distance (i.e., Euclidean distance). For instance, a Euclidean clustering algorithm can identify clusters from a plurality of points based on a distance metric. More specifically, in one or more embodiments the ground modeling system 100 applies a Euclidean clustering algorithm by comparing the distance between points in a three-dimensional representation to a distance metric.

As illustrated with regard to the embodiment of FIG. 3F, the ground modeling system 100 identifies three clusters by applying a Euclidean clustering algorithm to the modified point cloud 340. Specifically, the ground modeling system 100 has identified a first cluster 352 (i.e., corresponding to an area that includes the rock 302, the fence 304, and the bush 306), a second cluster 354 (i.e., corresponding to an area that includes the structure 308), and a third cluster 356 (i.e., corresponding to an area that includes the tree 309).

More particularly, the ground modeling system 100 includes points reflecting the bush 346 in the first cluster 352 because the points reflecting the bush 346 are close (in a Euclidean sense) to surrounding points in the modified point cloud 340. Similarly, the ground modeling system 100 includes points reflecting the rock 342 in the first cluster 352 because the points reflecting the rock 342 are a small distance from the surrounding points in the modified point cloud 340.

In contrast, the ground modeling system 100 identifies the second cluster 354 as including the points reflecting the structure 348 because the points reflecting the structure 348 in the modified point cloud 340 are separate (in a Euclidean sense) from surrounding points in the modified point cloud 340. Similarly, the ground modeling system 100 identifies the third cluster 356 as including points reflecting the tree 349 because the points reflecting the tree 349 (i.e., points modified based on application of the erosion and dilation operations) in the modified point cloud 340 are a large distance from the surrounding points in the modified point cloud 340.

Notably, by applying the erosion operation and dilation operation, and applying the filter height threshold and auxiliary threshold, the ground modeling system 100 more clearly delineates the tree from surrounding points. Indeed, the points reflecting the tree 349 in the modified point cloud 340 are much more distinct from surrounding points compared to the points reflecting the tree 319 in the point cloud 310. Indeed, in one or more embodiments, application of an erosion operation and dilation operation assist the ground modeling system 100 in removing points that would otherwise keep ground and non-ground points together in a Euclidean clustering sense.

Figure 3G:
FIG. 3G illustrates a representation of a three-dimensional point cloud upon removal of smaller clusters in accordance with one or more embodiments.

In addition to identifying clusters, one or more embodiments of the ground modeling system 100 remove additional points based on the clusters. For example, one or more embodiments compare the size of resulting clusters upon application of a clustering algorithm and remove points based on the comparison. For instance, FIG. 3G illustrates a filtered point cloud 370 upon removal of one or more points from the clusters of FIG. 3F. In particular, the ground modeling system 100 removes points corresponding to one or more clusters by comparing the size of clusters resulting from the clustering algorithm.

Specifically, with regard to FIG. 3G, the ground modeling system 100 identifies a largest cluster (i.e., the first cluster 352) from the clusters represented in FIG. 3F. Moreover, the ground modeling system 100 identifies small clusters by comparing the size of remaining clusters to the largest cluster (i.e., all clusters smaller than 15% of the first cluster 352 are identified as small clusters). Specifically, the ground modeling system 100 identifies both the second cluster 354 and the third cluster 356 as small clusters because both the second cluster 354 and the third cluster 356 are smaller than 15% of the size of the first cluster 352. Accordingly, the ground modeling system 100 generates the filtered point cloud 370 by removing points belonging to the small clusters (i.e., points belonging to the second cluster 354 and the third cluster 356) from the clustered point cloud 360.

The ground modeling system can determine a size of a cluster in a variety of ways. With regard to FIGS. 3F and 3G, the ground modeling system 100 identifies the size of a cluster based on the number of points contained within the cluster. Thus, the ground modeling system 100 utilizes the number of points in the first cluster 352 to identify the first cluster as the largest cluster, and compares the number of points in the first cluster 352 with the number of points in the second cluster 354 and the third cluster 356 to identify and remove smaller clusters. Other embodiments utilize alternative methods to identify the size of a cluster. For example, one or more embodiments of the ground modeling system 100 identify the physical size of an area encompassed by a cluster and utilize the physical size to compare one cluster to another.

Moreover, it will be appreciated that the ground modeling system 100 can utilize clusters in a variety of ways to identify non-ground control points. For instance, although the embodiment of FIG. 3F identifies a largest cluster and removes points belonging to clusters that are smaller than 15% of the largest cluster, other embodiments of the ground modeling system utilize other approaches to comparing clusters. For example, the ground modeling system 100 can utilize a variety of alternative percentages to identify smaller clusters (e.g., 5%, 10%, 20%, or some other percentage).

Similarly, rather than comparing a largest cluster to other clusters utilizing a percentage size, one or more embodiment of the ground modeling system 100 identify and utilize another cluster size. For example, one or more embodiments identify an average cluster size and remove points associated with clusters based on a comparison to the average cluster size (e.g., by removing clusters smaller than 5% of an average cluster size).

Moreover, rather than identifying smaller clusters based on a percentage of some other cluster size, one or more embodiments of the ground modeling system 100 identify smaller clusters by comparing the size of the clusters to some other value. For example, one or more embodiments of the ground modeling system 100 remove clusters smaller than a pre-determined cluster size threshold. Other embodiments of the ground modeling system 100 rank the clusters according to size and remove the lowest ranking clusters (e.g., remove the lowest cluster or the bottom 10% of clusters). Yet other embodiments utilize a combination of approaches to identify and remove small clusters (e.g., remove clusters that fall within the bottom 10% of clusters and are smaller than a pre-determined cluster size threshold).

At bottom, the ground modeling system 100 can utilize clusters to remove non-ground control points and generate the filtered point cloud 370. In particular, the filtered point cloud 370 now includes filtered points reflecting the rock 372 and filtered points reflecting the bush 376, but does not include points reflecting the fence 304, the structure 308, or the tree 309. Thus, as illustrated in FIGS. 3A-3G, one or more embodiments of the ground modeling system 100 can remove some non-ground points by applying an initial filter to a three-dimensional representation.

Although FIGS. 3A-3G are described with regard to particular non-ground objects (i.e., rocks, bushes, trees, etc.), it will be appreciated that the ground modeling system 100 can filter any type or variety of non-ground objects. For example, in addition to trees, bushes, fences, and structures, the ground modeling system 100 can remove vehicles, individuals, signs, poles, or other non-ground objects from a three-dimensional representation.

As mentioned previously, one or more embodiments of the ground modeling system 100 utilize a filtered, three-dimensional representation to identify regions. In particular, the ground modeling system can utilize a filtered, three-dimensional representation to identify regions corresponding to types of terrain reflected in the three-dimensional representation. For example, FIG. 4 illustrates defining regions in a three-dimensional representation according to one or more embodiments.

Figure 4:
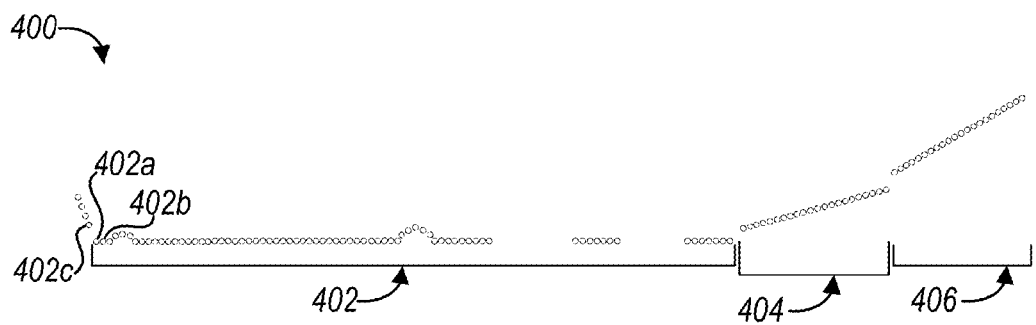
FIG. 4 illustrates a representation of defining regions of a site in accordance with one or more embodiments.

Specifically, FIG. 4 illustrates a filtered point cloud 400 (i.e., filtered according to one or more embodiments of the ground modeling system 100 described with regard to FIGS. 3A-3G). In particular, FIG. 4 illustrates the filtered point cloud 400 with a first region 402, a second region 404, and a third region 406. Moreover, each region 402-406 corresponds to a type of terrain. In particular, the ground modeling system identifies a type of terrain corresponding to each region 402-406 utilizing a first histogram 408, a second histogram 410, and a third histogram 412.

In one or more embodiments, the ground modeling system 100 builds the regions 402-406 by comparing differences in height between neighboring points in the filtered point cloud 400. By way of more specific example, the ground modeling system 100 builds the first region 402 starting with a first point 402a. The ground modeling system 100 adds the first point 402a to the first region 402 and compares the height of the first point 402a with its neighboring points 402b and 402c. Specifically, the ground modeling system 100 calculates the difference in height between point 402a and neighboring point 402b and the difference in height between point 402a and the neighboring point 402c.

Upon calculating the differences in height between the point 402a and its neighboring points 402b, 402c, the ground modeling system 100 determines whether to add neighboring points 402b, 402c to the region 402. In one or more embodiments, the ground modeling system 100 compares the differences in height to a region building value. For instance, with regard to FIG. 4, the ground modeling system 100 compares the difference in height between points 402*a* and 402*b* to a region building value of 5 cm.

Specifically, the ground modeling system 100 determines that the difference in height between points 402*a* and 402*b* is less than the region building value. Accordingly, the ground modeling system 100 adds the point 402*b* to the region 402. In contrast, the ground modeling system 100 compares the difference in height between points 402*a* and points 402*c* and determines that the difference in height is greater than the region building value. Based on that determination, the ground modeling system 100 does not add point 402*b* to the first region 402.

Upon adding the point 402*b* to the first region 402, in one or more embodiments the ground modeling system 100 analyzes the neighboring points of point 402*b* to determine whether the ground modeling system 100 will also add the neighboring points of the point 402*b* to the first region 402. Accordingly, the ground modeling system 100 compares the difference in height between point 402*b* and its neighboring points and adds the neighboring points to the first region 402 where a difference in height between the point 402*b* and its neighboring points falls within the region building value. In this manner, the ground modeling system 100 compares the heights of neighboring points within the filtered point cloud 400 and builds the first region 402, the second region 404, and the third region 406.

The ground modeling system 100 can select a region building value based on a variety of factors. For example, the ground modeling system 100 can select a region building value based on one or more features of a site (or a three-dimensional representation of the site). In particular the ground modeling system 100 can select a region building value based on analysis of changes in height within a site. For example, the ground modeling system 100 can determine the total range of height values from points in the filtered point cloud 400 and utilize the total range of height values to select the region building value (e.g., a percentage of the total range of height values. Similarly, the ground modeling system 100 can select the region building value based on an average height difference between points in a three-dimensional representation (e.g., a multiple of the average height difference).

Additionally or alternatively, the ground modeling system 100 can select the region building value based on the resolution or density of the filtered point cloud 400. For example, a point cloud having a lower density may have points that tend to be spaced further apart and tend to have greater differences in height. Accordingly, one or more embodiments of the ground modeling system 100 can select a region building value based on the resolution or density of a three-dimensional representation.

In other embodiments, the ground modeling system 100 can select the region building value based on user input. For instance, a user may provide a pre-defined value (e.g., 5 cm) as the region building value.

Prior to creating a region, one or more embodiments of the ground modeling system 100 analyze the size of a potential region. In particular, in one or more embodiments, the ground modeling system 100 will only create regions that exceed a certain size. For instance, once the ground modeling system 100 has added all neighboring points that fall within the region building value, the ground modeling system 100 will compare the size of the region to a region size threshold.

In one or more embodiments, the region size threshold is a size limitation with regard to the number of points in a region (e.g., a region must include at least 500 points). In other embodiments, the region size threshold is a limitation with regard to geographic size (e.g., a region must cover at least 10 m$^2$). The ground modeling system 100 can determine whether potential regions satisfy the region size threshold, and will only create a region from a potential region upon determining that the potential region satisfies the region size threshold.

Moreover, as discussed previously, upon creating a region, one or more embodiments of the ground modeling system 100 will analyze the region to determine a type of terrain corresponding to the region. In particular, the ground modeling system 100 can utilize histograms to determine the type of terrain corresponding to a region. Thus, with regard to FIG. 4, the ground modeling system 100 generates histograms 408-412, each histogram summarizing differences in height between points in each region.

For example, the first histogram 408 is an exemplary histogram representative of the first region 402 illustrated in FIG. 4. The first histogram 408 contains separate columns for ranges of height differences. In particular, the first histogram 408 contains individual columns for ranges of height differences from 0-1 cm, 1-2 cm, 2-3 cm, 3-4 cm, and 4-5 cm, respectively. Each column of the first histogram 408 also identifies the total number of height differences (i.e., the number of points that have a neighboring point with a particular height difference) that correspond to the ranges of height differences identified in the histogram. Thus, with regard to the first region 402, and as illustrated in the first histogram 408 of FIG. 4, there are 350 differences in height that fall between 0 and 1 cm; 100 differences in height that fall between 1 and 2 cm; 50 differences in height that fall between 2 and 3 cm; 25 differences in height that fall between 3 and 4 cm; and 25 differences in height that fall between 4 and 5 cm.

The ground modeling system 100 can utilize the first histogram 408 to identify a type of terrain associated with the region 402. In particular, one or more embodiments of the ground modeling system 100 compare histograms to a pattern to identify a particular type of terrain. For example, with regard to FIG. 4, the ground modeling system 100 utilizes a pattern that identifies flat terrain as any histogram that has a majority of height differences that fall within the range of 0 to 1 cm. Accordingly, because the majority of height difference in the first histogram 408 (i.e., 350 height differences out of a total of 550) fall within the range 0 to 1 cm, the ground modeling system 100 defines the first region 402 as a flat terrain.

Similarly, with regard to the second region 404, the ground modeling system 100 can identify a type of terrain by comparing the second histogram 410 to one or more patterns. In particular, the ground modeling system 100 with regard to the embodiment of FIG. 4, utilizes a pattern that identifies a terrain of moderate slope as any histogram that has a majority of height differences that fall within the range from 1 to 2 cm. Accordingly, because the majority of height differences in the second histogram 410 fall within the range from 1 to 2 cm, the ground modeling system 100 defines the second region 404 as a terrain of moderate slope.

In addition, the ground modeling system 100 can compare the third histogram 412 to one or more patterns to identify a type of terrain. In particular, the ground modeling system 100 with regard to the embodiment of FIG. 4 identifies a pattern that defines a terrain of steep slope as any histogram that has a majority of height differences that fall within the range from 2 to 3 cm. Accordingly, because the majority of height differences in the third histogram 412 fall within the range from 2 to 3 cm, the ground modeling system 100 defines the third region 406 as a terrain of steep slope.

It will be appreciated that aside from identifying a range with a majority of points, the ground modeling system 100 can utilize a variety of patterns to identify terrains of different types. For example, one or more embodiments may require a different percentage (or number) of height differences to fall within a particular range to qualify as a particular type of terrain (e.g., 75% must fall within a range from 1 to 2 cm to qualify as flat terrain). Similarly, rather than identifying types of terrain based on exceeding a certain percentage associated with a range of height differences, one or more patterns may place a maximum cap on a range of height differences (e.g., to qualify as flat terrain, less than 10% of height differences can fall within 4 to 5 cm). In some embodiments, the ground modeling system 100 can define a type of terrain based on a failure to meet another pattern (e.g., defining steep terrain as any region that does not qualify as a flat terrain or a moderately sloped terrain).

In addition, in one or more embodiments, the ground modeling system 100 utilizes patterns that analyze a variety of ranges to identify a type of terrain. For example, one or more embodiments may require a first range to exceed a certain percentage, a second range to exceed a certain percentage, and a third range to fall below a certain percentage. For instance, to qualify as flat terrain, one or more patterns may require at least 50% of height differences to fall within 0 to 1 cm, at least 30% to fall within 2 to 3 cm, and fewer than 5% to fall within 4 to 5 cm. In this manner, the ground modeling system 100 can define and identify a wide variety of types of terrain corresponding to three-dimensional representations of sites.

Moreover, although FIG. 4 illustrates particular ranges with regard to the histograms 408-412, it will be appreciated that the ground modeling system can utilize any number, size, or type of ranges. Indeed, rather than five ranges equally spanning 0 cm to 5 cm, the ground modeling system 100 can apply a different number of ranges (e.g., three ranges or ten ranges.), spanning different values (e.g., 0 to 10 cm or 0 to 1 m), each range covering a different span (e.g., a first range covering 0 to 1 cm, another range covering 2 to 4 cm, another column covering 5 to 8 cm, another column covering 6 to 10 cm). Indeed, the span of ranges reflected in the different columns of the histograms 408-412 could differ linearly (as in FIG. 4), exponentially, logarithmically, or according to some other model or function. Similarly, the ground modeling system 100 can apply terrain patterns that correspond to the particular form of histograms utilized.

Figure 5:
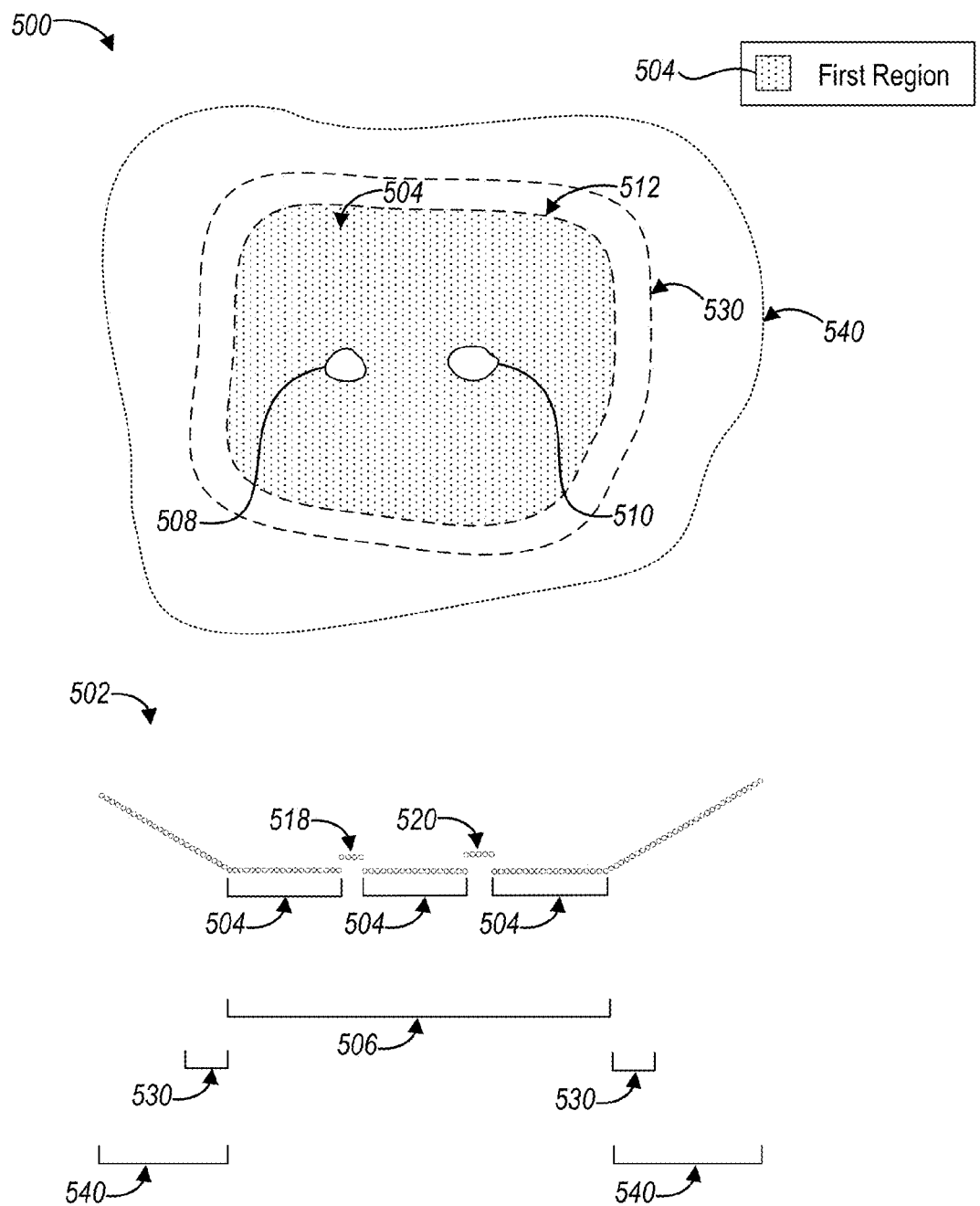
FIG. 5 illustrates a representation of expanding one or more regions of a site in accordance with one or more embodiments.

In addition to building regions and identifying types of terrains corresponding to the regions, the ground modeling system 100 can also expand regions and define one or more region borders. In particular, the ground modeling system can expand regions to absorb small objects. For example, FIG. 5 illustrates expanding a region and defining a region border in accordance with one or more embodiments. In particular, FIG. 5 illustrates representations of an aerial view 500 of a site and a corresponding point cloud 502 of the site. The site includes a first stump 508 and a second stump 510.

As shown, the ground modeling system 100 has analyzed the point cloud 502 and defined a first region 504. As illustrated in FIG. 5, the first region 504 does not include points reflecting the first stump 518 or points reflecting the second stump 520, even though the first stump 508 and the second stump 510 are surrounded by the first region 504. This circumstance can occur for a variety of reasons. For example, the stumps 508, 510 may differ in height from the surrounding ground so that they are not included in the first region 504; moreover, the number of points reflecting the stumps 508, 510 in the point cloud 502 are so small that the ground modeling system 100 may not define the stumps 508, 510 as independent regions. Accordingly, one or more embodiments of the ground modeling system 100 can grow the first region 504 to include the points reflecting the first stump 518 and the points reflecting the second stump 520.

For example, one or more embodiment the ground modeling system 100 defines a boundary of a region and identifies all points within the boundary not assigned to the region. For example, one or more embodiments of the ground modeling system 100 traverse each point within the boundary of a region and identify any neighboring points not included in the region.

Thus, with regard to FIG. 5, the ground modeling system 100 identifies a first region boundary 512. Moreover, the ground modeling system 100 identifies the points reflecting the first stump 518 and the points reflecting the second stump 520 as points within the first region boundary 512 not included in the first region 504. Moreover, the ground modeling system 100 expands the first region 504 to an expanded region 506 that includes the points reflecting the first stump 518 and the points reflecting the second stump 520.

In addition to expanding regions, the ground modeling system 100 can also define a region border. In particular, FIG. 5 shows a region border 530 of the expanded region 506. In one or more embodiments, the ground modeling system 100 generates a region border by applying a clustering algorithm and limiting the size of the resulting cluster(s) based on a distance from an existing region.

For example, with regard to FIG. 5, the ground modeling system 100 identifies the region border 530 by applying a clustering algorithm to the points in the point cloud 502 that are not included within the expanded region 506 (i.e., one or more points outside the region boundary 512). As illustrated, the clustering algorithm returns a cluster 540.

In one or more embodiments, the ground modeling system 100 identifies a region border based on the cluster and the region boundary. Thus, for example, in FIG. 5 the ground modeling system 100 identifies the region border 530 by limiting the size of the cluster 540 to a certain distance (e.g., region border distance of 1.5 m or 2 m) from the region boundary 512.

Moreover, in one or more embodiments, the ground modeling system 100 will only define a region border if the region border (or the cluster associated with the region border) satisfies a size threshold. For instance, one or more embodiments of the ground modeling system 100 apply a point number threshold (i.e., a minimum number of points) to a cluster. In particular, the ground modeling system 100 compares the number of points in the cluster 540 to the point number threshold (e.g., 500 points minimum). If the cluster 540 fails to satisfy the point number threshold, in one or more embodiments, the ground modeling system 100 does not define a region border based on the cluster. However, as illustrated, the cluster 540 satisfies the point number threshold, therefore, the ground modeling system 100 defines the region border 530 based on the cluster 540 (e.g., all points within the cluster 540 falling within 1.5 m of the region boundary 512).

Although FIG. 5 illustrates a single cluster (i.e., the cluster 540), the ground modeling system 100 can identify multiple clusters adjacent to a region. For example, the ground modeling system 100 can apply a clustering algorithm and identify a plurality of clusters adjacent to the first region 504. As described above, the ground modeling system 100 can identify one or more region borders from the plurality of clusters. For instance, the ground modeling system 100 can determine whether each cluster satisfies a point number threshold. Similarly, the ground modeling system can limit the size of each cluster to a certain distance from the region boundary 512. In this manner, the ground modeling system 100 can generate one or more region borders upon identifying a plurality of clusters adjacent to a region.

The ground modeling system 100 calculates region borders for a variety of reasons. For example, in some circumstances areas adjoining regions may remain undefined. For example, areas around regions may contain small objects that do not get captured within any region. Accordingly, one or more embodiments of the ground modeling system 100 define region borders to ensure that areas adjoining regions are captured and accounted for by the ground modeling system 100.

As described above, upon identifying regions (and/or region borders), the ground modeling system 100 can apply one or more additional filters. In particular, the ground modeling system 100 can apply one or more additional filters utilizing region specific filter parameters. Specifically, the ground modeling system 100 can apply an erosion operation, apply a dilation operation, remove or modify points, apply a clustering algorithm, and remove points based on identified clusters based on region specific filter parameters. Accordingly, FIGS. 6A-6D illustrate applying a second filter with region specific parameters according to one or more embodiments.

Figure 6A:
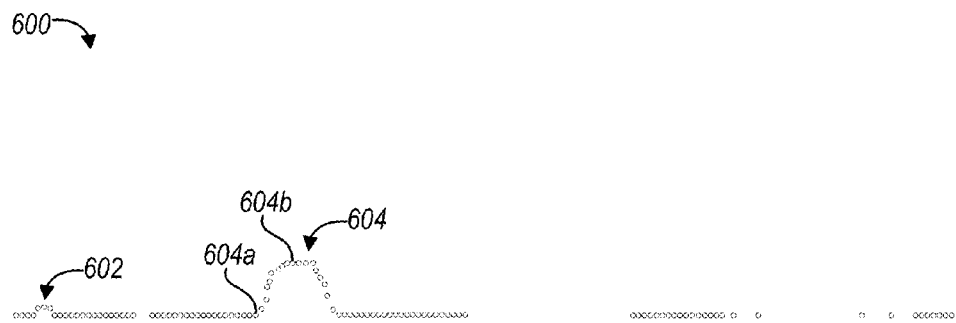
FIG. 6A illustrates a filtered, three-dimensional point cloud in accordance with one or more embodiments.

In particular, FIG. 6A illustrates an initially filtered point cloud 600. The initially filtered point cloud 600 includes points reflecting a rock 602 and points reflecting a bush 604 (e.g., points from the filtered point cloud 370). Moreover, the ground modeling system 100 generates the initially filtered point cloud 600 utilizing an initial filter with initial filter parameters, as described previously (e.g., the filtered point cloud 370 utilizing the filter radius 321 and the filter height threshold 341). In addition, utilizing techniques described above, the ground modeling system 100 identifies the points reflected in the initially filtered point cloud 600 as being part of a flat region (e.g., the flat type of terrain corresponding to the first region 504).

Accordingly, as mentioned previously, the ground modeling system 100 can apply one or more parameters specific to a flat region. For example, the ground modeling system 100 can apply a filter utilizing a filter radius, a filter height threshold, an auxiliary threshold, or other filter parameters specific to a flat region.

Figure 6B:
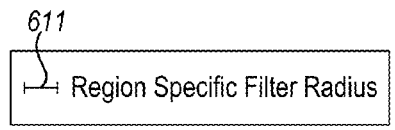
FIG. 6B illustrates application of an erosion operation to the filtered, three-dimensional point cloud of FIG. 6A in accordance with one or more embodiments.
Figure 6B:
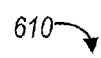
Figure 6B:
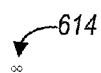
Figure 6C:
FIG. 6C illustrates application of a dilation operation to the eroded three-dimensional point cloud of FIG. 6B in accordance with one or more embodiments.
Figure 6C:

For example, FIG. 6B illustrates an eroded point cloud 610 resulting from application of an erosion operation to the initially filtered point cloud 600 utilizing a region specific filter radius 611. Notably, the region specific filter radius 611 differs from the filter radius 321. In particular, the region specific filter 621 is larger than the filter radius 321. Indeed, one or more embodiments of the ground modeling system 100 apply a region specific filter radius that is larger than an initial filter radius to more aggressively filter non-ground objects in light of the particular type of terrain at issue. For instance, the ground modeling system 100 can utilize a larger filter radius with regard to FIG. 6 in light of determining that the initially filtered point cloud 600 corresponds to a flat type of terrain.

As illustrated in FIG. 6B, applying an erosion operation utilizing a larger filter can more aggressively remove non-ground points. In particular, the eroded point cloud 610 does not contain any points reflecting the rock 602 and only contains two eroded points reflecting the bush 614. Indeed, lower ground points fall within the region specific filter radius 611 of all but two of the points reflecting the bush 604; accordingly, all but two of the point reflecting the bush 604 are replaced with a surrounding lower ground point in the eroded point cloud 610.

As discussed previously, one or more embodiments of the ground modeling system 100 applies both an erosion operation and a dilation operation. FIG. 6B illustrates a dilated point cloud 620 upon application of a dilation operation to the eroded point cloud 610 utilizing the region specific filter radius 611. As illustrated, application of an erosion operation and dilation operation with a larger filter radius can more clearly delineate ground objects from non-ground objects. For instance, dilated points reflecting the bush 624 are more starkly separated from lower points reflecting the ground.

In addition to applying an erosion and dilation operation, the ground modeling system 100 can remove or modify points by comparing the initially filtered point cloud 600 (or the point cloud 302) to the dilated point cloud 620. In particular, the ground modeling system 100 can utilize one of the approaches previously described with regard to FIG. 3D in applying a filter height threshold and/or an auxiliary threshold. In addition, however, the ground modeling system 100 can also apply filter parameters specific to the type of terrain at issue. For example, the ground modeling system 100 can calculate a difference in height between points in the initially filtered point cloud 600 (or the point cloud 302) and the dilated point cloud 620. Moreover, the ground modeling system 100 can compare the difference in height to a region specific filter height threshold 631 and/or a region specific auxiliary threshold 631a.

Figure 6D:
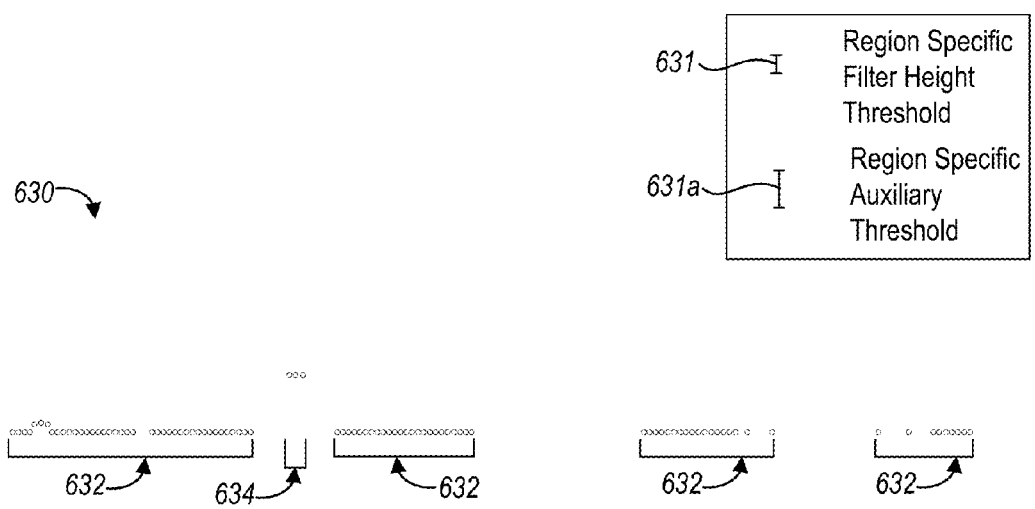
FIG. 6D illustrates a modified three-dimensional point cloud upon application of a region specific filter height threshold in accordance with one or more embodiments.
Figure 6E:
FIG. 6E illustrates a final three-dimensional point cloud upon removal of one or more clusters in accordance with one or more embodiments.

For example, as illustrated in FIG. 6D, based on a determination that the initially filtered point cloud 600 reflects a flat type of terrain, the ground modeling system 100 can apply a smaller filter height threshold and/or a smaller auxiliary threshold in producing a modified point cloud 630. Utilizing a smaller filter height threshold and/or a smaller auxiliary threshold can result in removing additional points from the initially filtered point cloud 600. For example, as illustrated in FIG. 6D, application of the region specific filter height threshold 631 and the region specific auxiliary threshold 631a remove some of the points reflecting the bush 604 from the initially filtered point cloud 600.

For example, the ground modeling system 100 can calculate the difference in height between point 604a from the initially filtered point cloud 600 and the corresponding point 624a from the dilated point cloud 620. Moreover, the ground modeling system 100 can compare the difference in height to the region specific filter height threshold 631 and the filter specific auxiliary threshold 631a. With regard to FIG. 6D, the ground modeling system 100 determines that the difference in height is greater than the region specific filter height threshold 631 and the region specific auxiliary threshold 631a. Accordingly, the ground modeling system 100 removes the point 604a from the initially filtered point cloud 600 in generating the modified point cloud 630.

Similarly, the ground modeling system 100 can calculate the difference in height between point 604b from the initially filtered point cloud 600 and the corresponding point 624b from the dilated point cloud 620 and compare the difference with the region specific filter height threshold 631 and the filter specific auxiliary threshold 631a. As illustrated, the ground modeling system 100 determines that the difference in height is greater than the region specific filter height threshold 631 but less than the region specific filter specific auxiliary threshold 631a. Accordingly, the ground modeling system replaces the point 604b in the initially filtered point cloud 600 with the dilated point 624b in the dilated point cloud 620 in generating the modified point cloud 630.

Moreover, as discussed previously, the ground modeling system 100 can also apply a clustering algorithm to the modified point cloud 630 and remove additional points based on the identified clusters (e.g., as articulated previously with regard to FIGS. 3E and 3F). Indeed, as shown in FIG. 6D, the ground modeling system 100 identifies a first cluster 632 and a second cluster 634 based on the modified point cloud 630. In particular, the second cluster 634 corresponds to points reflecting the tree. By more clearly delineating the points reflecting the tree from surrounding points, the ground modeling system 100 identifies the tree as an independent cluster upon application of a clustering algorithm.

Moreover, in one or more embodiments, the ground modeling system 100 can also modify a distance metric associated with the clustering algorithm based on a particular type of terrain at issue. Thus, in addition to modifying a filter height threshold or filter radius, the ground modeling system 100 can also modify a distance metric to more particularly apply a clustering algorithm to a particular type of terrain.

As discussed previously, the ground modeling system 100 can compare the first cluster 632 and the second cluster 634 to determine one or more points to remove from the modified point cloud 630. In particular, the ground modeling system 100 can compare the size of the first cluster 632 and the size of the second cluster 634. For example, the ground modeling system 100 identifies the first cluster 632 as the largest cluster with regard to the modified point cloud 630 and determines that the size of the second cluster 634 is smaller than a certain percentage of the first cluster 632 (e.g., determines that the second cluster 634 is less than 15% of the size of the first cluster 632). As described above (e.g., with regard to FIGS. 3F, 3G), the ground modeling system 100 can utilize a variety of methods to compare the first cluster 632 and the second cluster 634 (e.g., applying a cluster size threshold, comparing average cluster size). Moreover, one or more embodiments modify the parameters applicable to comparing cluster sizes based on the type of terrain at issue.

Based on the comparison between the first cluster 632 and the second cluster 634, the ground modeling system 100 removes one or more points from the modified point cloud 630. In particular, as reflected in FIG. 6E, the ground modeling system 100 removes points from the modified point cloud 630 to generate a final point cloud 640. Specifically, based on the comparison between the first cluster 632 and the second cluster 634, the ground modeling system 100 removes the second cluster 634 from the modified point cloud 630 to generate the final point cloud 640.

As illustrated, the final point cloud 640 contains only ground points (i.e., points reflecting ground surfaces, including points reflecting the rock). By applying region specific parameters, the ground modeling system 100 removed the points reflecting the tree 604. Moreover, by applying an initial filter utilizing initial parameters, identifying regions, and applying a second filter utilizing region specific parameters, the ground modeling system 100 removed all non-ground points (e.g., the points reflecting the fence 304, the points reflecting the bush 306 the points reflecting the structure 308, and the points reflecting the tree 309).

In addition to the flat region described with regard to FIGS. 6A-6E, the ground modeling system 100 can apply region specific parameters to other regions in and other regions types identified in a three-dimensional representation. For instance, in embodiments of the ground modeling system 100 that identify multiple types of terrain within a three-dimensional representation, the ground modeling system 100 can apply filters with region specific parameters to each type of terrain. Indeed, although FIGS. 6A-6E illustrates application of a second filter with region specific parameters to a flat terrain, the ground modeling system 100 can apply a second filter with region specific parameters to any identified type of terrain.

For example, with regard to a region corresponding to a terrain of moderate slope (e.g., the second region 404), in one or more embodiments the ground modeling system 100 can apply parameters specific to a terrain of moderate slope. Particularly, the ground modeling system 100 can apply a different filter radius, a different filter height threshold, or a different auxiliary threshold. For instance, the ground modeling system 100 can apply a different filter radius (e.g., a filter radius larger than the filter radius 321 but smaller than the region specific filter radius 611 or a filter radius larger than both the filter radius 321 and the region specific filter radius 611). Similarly, the ground modeling system 100 can apply a different a filter height threshold (e.g., a filter height threshold smaller than the filter height threshold 341 but larger than the region specific filter height threshold 631 or a filter height threshold smaller than the filter height threshold 341 and the region specific filter height threshold 631).

In addition, the ground modeling system 100 can apply a different auxiliary threshold. For instance, in one or more embodiments, the ground modeling system 100 selects an auxiliary threshold based on magnitude of a filter height threshold. Accordingly, in such embodiments, a modification in the filter height threshold also modifies an auxiliary threshold (e.g., applying a different filter height threshold will modify an auxiliary threshold that is calculated as a multiple of 1.5 times the filter height threshold).

In other embodiments, the ground modeling system 100 can modify the manner in which an auxiliary threshold is selected based on a particular type of terrain. For example, based on a particular type of terrain, the ground modeling system 100 can selection an auxiliary threshold in any manner described previously with regard to FIGS. 3A-3G (e.g., different multiples of the filter height threshold, addition of various set amounts from the filter height threshold).

Moreover, the ground modeling system 100 can modify any filter parameters described herein in applying filters with region specific parameters to different types of terrain. Indeed, although some examples described above illustrate modification of a filter radius, a filter height threshold, or an auxiliary threshold, the ground modeling system 100 can also modify other filter parameters, including, but not limited to, cluster size thresholds, cluster comparison parameters, or other parameters.

Furthermore, in addition to applying filters with filter parameters specific to one or more regions, the ground modeling system 100 can also apply parameters specific to one or more region borders. For example, with regard to the region border 530, the ground modeling system 100 can apply a second filter with parameters specific to the region border 530. For instance, the ground modeling system 100 can apply a filter utilizing a first filter radius with regard to the expanded region 506 and apply a second filter with a second filter radius with regard to the region border 530.

In one or more embodiments, the ground modeling system 100 applies parameters to region borders based on the regions that they border. For instance, the ground modeling system 100 can apply parameters specific to the region border 530 based on the parameters of the expanded region 506. For example, the ground modeling system 100 can apply a filter radius to the region border 530 that is a predetermined multiple of a filter radius applied to the expanded region 506.

Moreover, in one or more embodiments, the ground modeling system 100 also applies an additional color filter. For instance, in one or more embodiments, the ground modeling system 100 applies a color filter to further remove small vegetation or other objects from a three-dimensional representation. In particular, in one or more embodiments, the ground modeling system 100 utilizes a color-based morphological filter to further remove one or more non-ground objects (i.e., a morphological filter that analyzes differences in color rather than differences in height, utilizing approaches described above).

As mentioned previously, one or more embodiments of the ground modeling system 100 prioritize one or more regions. In particular, the ground modeling system 100 can emphasize one or more regions based on a type of terrain. For example, in one or more embodiments the ground modeling system 100 analyzes all regions corresponding to a particular type of terrain before analyzing additional regions of different types of terrains.

For instance, in one or more embodiments, the ground modeling system emphasizes regions corresponding to flat terrains. Specifically, in one or more embodiments the ground modeling system 100 emphasizes regions that correspond to a flat terrain by creating those regions before creating other regions. In addition to creating regions corresponding to flat terrain first, other embodiments of the ground modeling system 100 expand those regions, identify borders for those regions, and apply additional filters to those regions before other regions corresponding to other terrain types.

In other embodiments, the ground modeling system can create regions, expand regions, define region boundaries, and apply filters in a different order or arrangement. For example, one or more embodiments of the ground modeling system 100 identify regions corresponding to steep terrain before other types of terrain. Other embodiments of the ground modeling system 100 do not prioritize one type of region over another in identifying regions or applying filters. Other embodiments of the ground modeling system create all regions first and define region boundaries after all regions have been defined. In sum, the ground modeling system 100 can define regions, expand regions, define region boundaries, and apply filters in a variety of arrangements, orders, or priorities depending on the embodiment.

Figure 7:
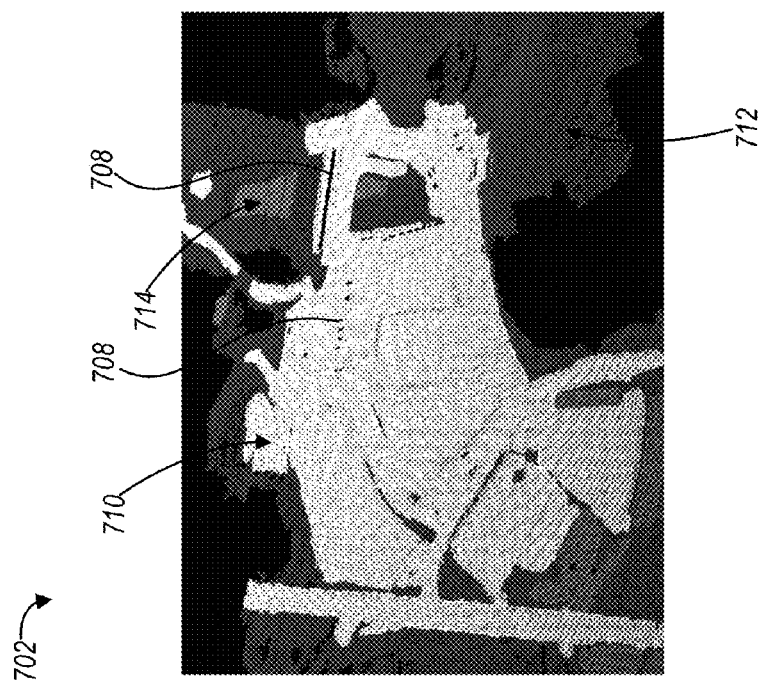
FIG. 7 illustrates an aerial view of site and a filtered, three-dimensional model of the site in accordance with one or more embodiments.
Figure 7:
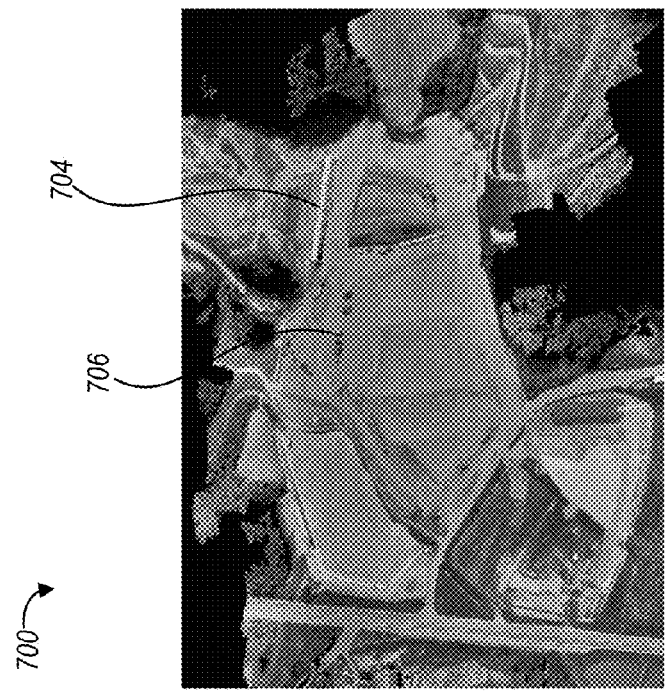

As discussed previously, one or more embodiments of the ground modeling system 100 can provide information regarding three-dimensional representations for display. In particular, the ground modeling system 100 can provide filtered, three-dimensional models for display. FIG. 7 illustrates a filtered, three-dimensional model in accordance with one or more embodiments. In particular, FIG. 7 illustrates an aerial view 700 of a site and a filtered, three-dimensional model 702 with regard to the site.

As illustrated in the aerial view 700, the site contains structures 704, vehicles 706, and other non-ground objects. As discussed above, however, the ground modeling system 100 can remove such non-ground objects from a three-dimensional representation of the site. Thus, as illustrated in the filtered, three-dimensional model 702, the ground modeling system 100 has removed the structures 704, the vehicles 706, and other objects. In particular, the filtered, three-dimensional model contains voids 708 where the ground modeling system 100 removed the structures 704, the vehicles 706, and other objects.

Moreover, as discussed above, the ground modeling system 100 can utilize different parameters specific to different regions. The filtered, three-dimensional representation 702 indicates the regions identified by the ground modeling system 100 with regard to the embodiment of FIG. 7. In particular, the filtered, three-dimensional representation 702 includes a first region 710, a second region 712, and a third region 714. The ground modeling system 100 applies different, region specific parameters to each of the first region 710, the second region 712, and the third region 714 in removing non-ground points (i.e., the structures 702 and the vehicles 704).

It will be appreciated that the ground modeling system 100 can generate a variety of models or other information with regard to three-dimensional representations. Thus, although the filtered, three-dimensional model 702 indicates the voids 708 and various shades to represent regions, other embodiments may provide different or alternative visual representations. For example, one or more embodiments of the ground modeling system 100 generate a three-dimensional mesh that fills in voids based on surrounding three-dimensional points.

Moreover, as discussed above, the ground modeling system 100 can further generate tables, summaries, estimates, and other information related to a three-dimensional mesh. For instance, if the site illustrated in FIG. 7 includes a mining area, the ground modeling system 100 can provide an estimate of the volume of material available in the mining area. Alternatively, if the site illustrated in FIG. 7 is to be utilized for residential construction, the ground modeling system 100 can provide the filtered, three-dimensional model 704 for utilization by engineers in designing sewer, water, grading, drainage or other design plans.

Figure 8:
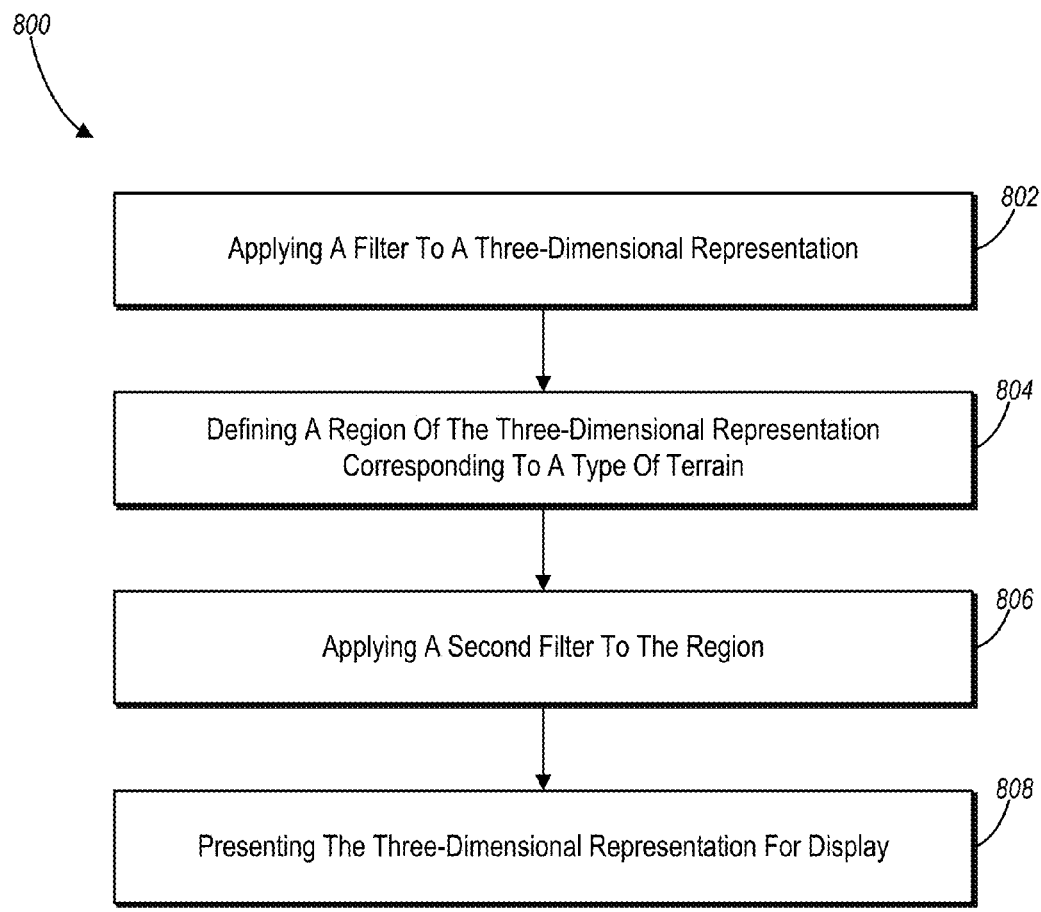
FIG. 8 illustrates a flowchart of a series of acts in a method of generating a ground model in accordance with one or more embodiments.

FIGS. 1-7, the corresponding text, and the examples, provide a number of different systems and devices that allows a user to generate a filtered, three-dimensional ground model (e.g., a ground model without non-ground points). In addition to the foregoing, embodiments can also be described in terms of flowcharts comprising acts and steps in a method for accomplishing a particular result. For example, FIG. 8 illustrates a flowchart of an exemplary method in accordance with one or more embodiments of the present invention. The method described in relation to FIG. 8 may be performed with less or more steps/acts or the steps/acts may be performed in differing orders. Additionally, the steps/acts described herein may be repeated or performed in parallel with one another or in parallel with different instances of the same or similar steps/acts.

FIG. 8 illustrates a flowchart of a series of acts in a method 800 of generating a filtered ground model. In one or more embodiments, the method 800 is performed in an environment that includes the system 200. The method 800 is intended to be illustrative of one or more methods in accordance with the present disclosure, and is not intended to limit potential embodiments. Alternative embodiments can include additional, fewer, or different steps than those articulated in FIG. 8.

The method 800 includes an act 802 of applying a filter to a three-dimensional representation. In particular, the act 802 may include applying a first filter to a three-dimensional representation of a site utilizing a first set of one or more filter parameters. More particularly, in at least one embodiment, the first set of one or more filter parameters comprises a first filter radius and a first filter height threshold, the first filter radius comprising a maximum horizontal distance between two points and the first filter height threshold comprising a maximum difference in height values.

Thus, for instance, the act 802 may include applying a first filter to a three-dimensional point cloud representing a site utilizing a first set of one or more filter parameters, the first set of one or more filter parameters comprising a first filter radius and a first filter height threshold.

In addition, the act 802 may also include, applying an erosion operation and a dilation operation to the three-dimensional representation utilizing the first filter radius. More particularly, the act 802 may include identifying at least one point of the three-dimensional representation; identifying additional points that fall within the first filter radius from the at least one point; applying an erosion operation to the at least one point, the erosion operation based on height values corresponding to the identified at least one point and the identified additional points that fall within the filter radius from the at least one point; and applying a dilation operation to the eroded at least one point, the dilation operation based on a height value corresponding to the eroded at least one point and additional points that fall within the filter radius from the eroded at least one point.

Moreover, in at least one embodiment, the act 802 includes identifying a difference between the height value corresponding to the dilated at least one point and the height value corresponding to the at least one point; determining that the identified difference between the height value corresponding to the dilated at least one point and the height value corresponding to the at least one point exceeds the filter height threshold; if the identified difference between the height value corresponding to the dilated at least one point and the height value corresponding to the at least one point exceeds an auxiliary threshold, removing the at least one point from the three-dimensional representation; and if the identified specified threshold difference between the height value corresponding to the dilated at least one point and the height value corresponding to the at least one point does not exceed the auxiliary threshold, replacing the at least one point with the dilated at least one point.

Thus, the act 802 may include identifying a difference between a height value of a point of the three-dimensional representation and a height value of a corresponding point of the dilated three-dimensional representation; comparing the identified difference to the filter height threshold and an auxiliary threshold, and based on the comparison, modifying the three-dimensional representation by replacing the point of the three-dimensional representation with the corresponding point of the dilated three-dimensional representation. Moreover, in at least one embodiment, the act 802 can include, based on the comparison, removing the point of the three-dimensional representation from the three-dimensional representation.

Furthermore, in at least one embodiment, the act 802 also includes utilizing a clustering algorithm to group the points of the three-dimensional representation into a plurality of clusters based on distance between the points; identifying a largest cluster of the plurality of clusters; identifying at least one smaller cluster; and removing one or more points from the three-dimensional representation that correspond to the at least one smaller cluster.

As illustrated in FIG. 8, the method 800 can also include the act 804 of defining a region of the three-dimensional representation corresponding to a type of terrain. In particular, the act 804 can include defining a first region of the filtered three-dimensional representation corresponding to a first type of terrain, wherein the first region comprises a first plurality of points, the first plurality of points being a subset of points of the filtered three-dimensional representation.

In addition, in at least one embodiment, the act 804 includes identifying a first point; comparing a height of the first point to a height of a neighboring point of the first point; adding the neighboring point to the first region based on the comparison; generating a histogram of height differences, the histogram of height differences comprising the difference in height between the first point and the neighboring point; determining that a number of data points in the first region exceeds a size threshold; and determining that the histogram of height differences satisfies a pre-determined height difference threshold corresponding to the first type of terrain.

Furthermore, in at least one embodiment, the act 804 includes growing the first region by: identifying an outer boundary of the first region; identifying points within the outer boundary of the first region not yet added to the first region; and adding the points identified within the outer boundary to the first region.

Moreover, the act 804 can also include defining a region border. For instance, in one or more embodiments the act 804 includes defining a region border of the first region by: identifying, using a clustering algorithm, a cluster of points from the three-dimensional representation beyond the outer boundary of the first region; determining that a number of points in the identified cluster of points exceeds a point number threshold; identifying points in the cluster of points that fall within a pre-defined distance from the outer boundary; and adding the identified points in the cluster of points to the border of the first region based on the determination that the number of points in the identified cluster of points exceeds the point number threshold and fall within the pre-defined distance from the outer boundary.

As shown in FIG. 8, the method 800 may also include the act 806 of applying a second filter to the region. In particular, the act 806 may include generating a final three-dimensional representation by applying a second filter to the first region utilizing a second set of one or more filter parameters different from the first set of one or more filter parameters. In one or more embodiments, the act 805 includes applying a second filter to the first region utilizing a second set of one or more filter parameters based on the first type of terrain.

For example, in at least one embodiment, the second set of one or more filter parameters comprises a second filter radius different than the first filter radius and a second filter height threshold different than the first filter height threshold. For instance, in at least one embodiment, the second filter radius is greater than the first filter radius. Similarly, in at least one embodiment, the second filter height threshold is smaller than the first filter height threshold. Thus, in at least one embodiment, the act 802 includes generating a final three-dimensional representation by applying a second filter to the first region utilizing a second set of one or more filter parameters different from the first set of one or more filter parameters, the second set of one or more filter parameters comprising a second filter radius larger than the first filter radius and a second filter height threshold smaller than the first filter height threshold.

In addition, in at least one embodiment, applying the second filter to the three-dimensional representation further comprises applying an erosion operation and a dilation operation to the three-dimensional representation utilizing the second filter radius.

Moreover, in at least one embodiment, generating the final three-dimensional representation further comprises applying a third filter to the region border of the first region, the third filter utilizing a third set of one or more filter parameters different than the second set of one or more filter parameters.

In addition, as illustrated in FIG. 8, the method 800 may also include the act 808 of presenting the three-dimensional representation for display. In particular, the act 808 may include presenting for display the final three-dimensional representation.

In addition, the method 800 may also include, defining a second region corresponding to a second type of terrain, wherein the second region comprises a second subset of the points of the three-dimensional representation that does not include points included in the first region. Moreover, in at least one embodiment, generating the final three-dimensional representation further comprises applying a third filter to the second region utilizing a third set of one or more filter parameters, wherein the third set of one or more filter parameters differs from the first and second sets of one or more filter parameters. For example, in one or more embodiments, the third set of one or more filter parameters comprises a third filter height threshold greater than the first filter height threshold and smaller than the second filter height threshold. Furthermore, in at least one embodiment, the first type of terrain is a terrain of a first slope, the second type of terrain is a terrain of a second slope greater than the first slope, the second set of one or more filter parameters comprises a second filter height threshold, and the third set of one or more filter parameters comprises a third height threshold greater than the second height threshold.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. In certain particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the invention can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general purpose computer to turn the general purpose computer into a special purpose computer implementing elements of the invention. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the invention can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
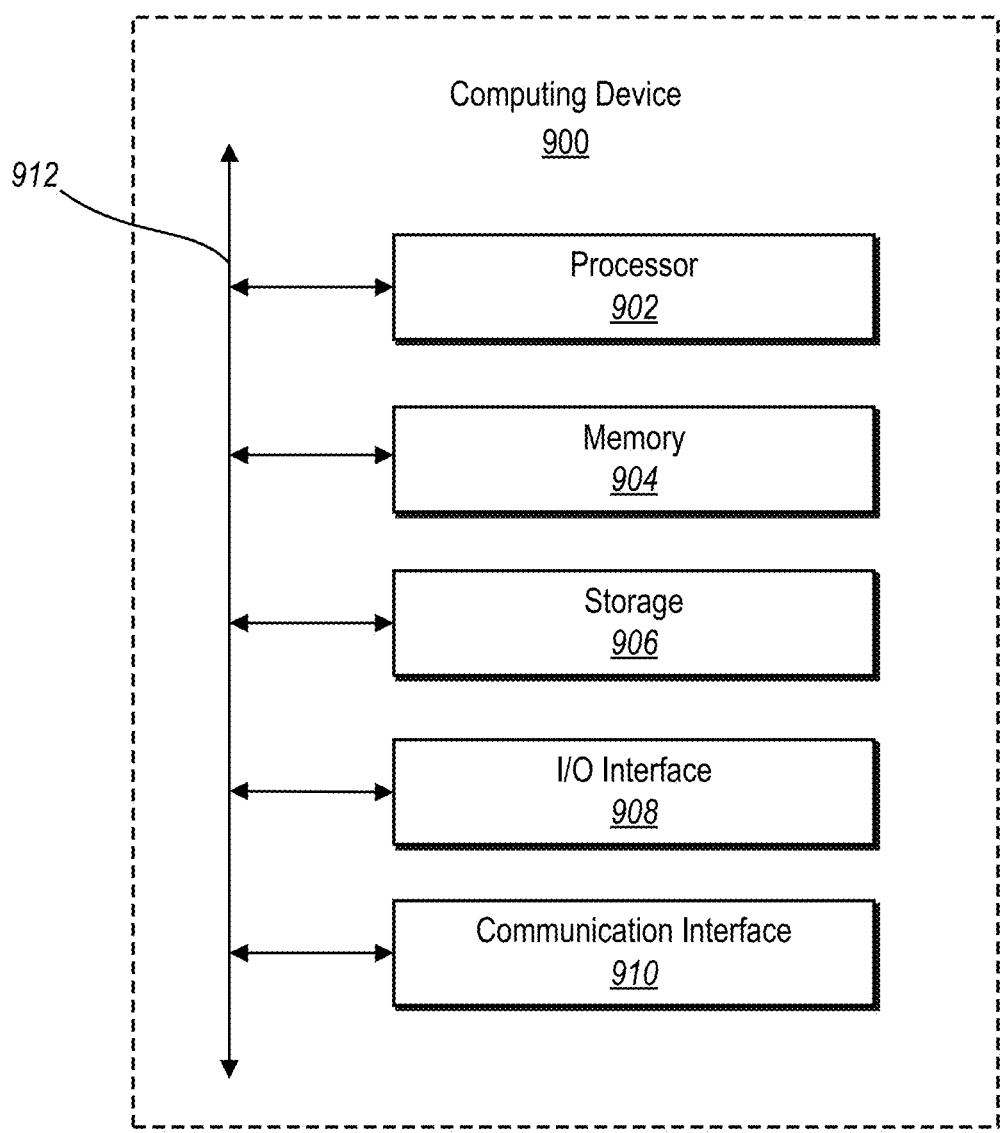
FIG. 9 illustrates a block diagram of an exemplary computing device in accordance with one or more embodiments.

FIG. 9 illustrates, in block diagram form, an exemplary computing device 1100 that may be configured to perform one or more of the processes described above. One will appreciate that the ground modeling system 100 can comprise implementations of the computing device 900. As shown by FIG. 9, the computing device can comprise a processor 902, memory 904, a storage device 906, an I/O interface 908, and a communication interface 910. While an exemplary computing device 900 is shown in FIG. 9, the components illustrated in FIG. 9 are not intended to be limiting. Additional or alternative components may be used in other embodiments. Furthermore, in certain embodiments, a computing device 900 can include fewer components than those shown in FIG. 9. Components of computing device 900 shown in FIG. 9 will now be described in additional detail.

In particular embodiments, processor(s) 902 includes hardware for executing instructions, such as those making up a computer program. As an example and not by way of limitation, to execute instructions, processor(s) 902 may retrieve (or fetch) the instructions from an internal register, an internal cache, memory 904, or a storage device 906 and decode and execute them. In particular embodiments, processor(s) 902 may include one or more internal caches for data, instructions, or addresses. As an example and not by way of limitation, processor(s) 902 may include one or more instruction caches, one or more data caches, and one or more translation lookaside buffers (TLBs). Instructions in the instruction caches may be copies of instructions in memory 904 or storage 906.

The computing device 900 includes memory 904, which is coupled to the processor(s) 902. The memory 904 may be used for storing data, metadata, and programs for execution by the processor(s). The memory 904 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 904 may be internal or distributed memory.

The computing device 900 includes a storage device 906 includes storage for storing data or instructions. As an example and not by way of limitation, storage device 906 can comprise a non-transitory storage medium described above. The storage device 906 may include a hard disk drive (HDD), a floppy disk drive, flash memory, an optical disc, a magneto-optical disc, magnetic tape, or a Universal Serial Bus (USB) drive or a combination of two or more of these. Storage device 906 may include removable or non-removable (or fixed) media, where appropriate. Storage device 906 may be internal or external to the computing device 900. In particular embodiments, storage device 906 is non-volatile, solid-state memory. In particular embodiments, storage device 906 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The computing device 900 also includes one or more input or output ("I/O") devices/interfaces 908, which are provided to allow a user to provide input to (such as user strokes), receive output from, and otherwise transfer data to and from the computing device 900. These I/O devices/interfaces 908 may include a mouse, keypad or a keyboard, a touch screen, camera, optical scanner, network interface, modem, other known I/O devices or a combination of such I/O devices/interfaces 908. The touch screen may be activated with a stylus or a finger.

The I/O devices/interfaces 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 908 is configured to provide graphical data to a display for presentation to a user. The graphical data may be representative of one or more graphical user interfaces and/or any other graphical content as may serve a particular implementation.

The computing device 900 can further include a communication interface 910. The communication interface 910 can include hardware, software, or both. The communication interface 910 can provide one or more interfaces for communication (such as, for example, packet-based communication) between the computing device and one or more other computing devices 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI.

This disclosure contemplates any suitable network and any suitable communication interface 910. As an example and not by way of limitation, computing device 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computing system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof. Computing device 900 may include any suitable communication interface 910 for any of these networks, where appropriate.

The computing device 900 can further include a bus 912. The bus 912 can comprise hardware, software, or both that couples components of computing device 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

We claim:

1. A computer-implemented method, comprising:
    applying a first filter to a three-dimensional representation of a site utilizing a first set of one or more filter parameters, the first set of one or more filter parameters comprising a first filter radius;
    defining a first region of the filtered three-dimensional representation corresponding to a first type of terrain, wherein the first region comprises a first plurality of points, the first plurality of points being a subset of points of the filtered three-dimensional representation;
    generating a final three-dimensional representation by applying a second filter to the first region utilizing a second set of one or more filter parameters different from the first set of one or more filter parameters, the second set of one or more filter parameters comprising a second filter radius; and
    presenting for display the final three-dimensional representation.

2. The method of claim 1,
    wherein the first set of one or more filter parameters comprises the first filter radius and a first filter height threshold, the first filter radius comprising a maximum horizontal distance between two points and the first filter height threshold comprising a maximum difference in height values; and
    wherein the second set of one or more filter parameters comprises the second filter radius different than the first filter radius and a second filter height threshold different than the first filter height threshold.

3. The method of claim 1, wherein the second filter radius is greater than the first filter radius.

4. The method of claim 2, further comprising defining a second region corresponding to a second type of terrain, wherein the second region comprises a second subset of the points of the three-dimensional representation that does not include points included in the first region; and
    wherein generating the final three-dimensional representation further comprises applying a third filter to the second region utilizing a third set of one or more filter parameters, wherein the third set of one or more filter parameters differs from the first and second sets of one or more filter parameters.

5. The method of claim 4, wherein the first type of terrain is a terrain of a first slope, the second type of terrain is a terrain of a second slope greater than the first slope, the second set of one or more filter parameters comprises a second filter height threshold, and the third set of one or more filter parameters comprises a third height threshold greater than the second height threshold.

6. The method of claim 2, wherein applying the first filter to the three-dimensional representation further comprises:
    identifying at least one point of the three-dimensional representation;
    identifying additional points that fall within the first filter radius from the at least one point;
    applying an erosion operation to the at least one point, the erosion operation based on height values corresponding to the identified at least one point and the identified additional points that fall within the filter radius from the at least one point; and
    applying a dilation operation to the eroded at least one point, the dilation operation based on a height value corresponding to the eroded at least one point and additional points that fall within the filter radius from the eroded at least one point.

7. The method of claim 6, wherein applying the first filter to the three-dimensional representation further comprises:
    identifying a difference between the height value corresponding to the dilated at least one point and the height value corresponding to the at least one point;
    determining that the identified difference between the height value corresponding to the dilated at least one point and the height value corresponding to the at least one point exceeds the filter height threshold;
    if the identified difference between the height value corresponding to the dilated at least one point and the height value corresponding to the at least one point exceeds an auxiliary threshold, removing the at least one point from the three-dimensional representation; and
    if the identified specified threshold difference between the height value corresponding to the dilated at least one point and the height value corresponding to the at least one point does not exceed the auxiliary threshold, replacing the at least one point with the dilated at least one point.

8. The method of claim 7, wherein applying the first filter to the three-dimensional representation further comprises:
    utilizing a clustering algorithm to group the points of the three-dimensional representation into a plurality of clusters based on distance between the points;
    identifying a largest cluster of the plurality of clusters;
    identifying at least one smaller cluster; and
    removing one or more points from the three-dimensional representation that correspond to the at least one smaller cluster.

9. The method of claim 1, wherein defining a first region corresponding to the first type of terrain further comprises:
    identifying a first point;
    comparing a height of the first point to a height of at least one neighboring point of the first point;
    adding the at least one neighboring point to the first region based on the comparison;

generating a histogram of height differences, the histogram of height differences comprising a difference in height between the first point and the at least one neighboring point;

determining that a number of data points in the first region exceeds a size threshold; and determining that the histogram of height differences satisfies a pre-determined height difference threshold corresponding to the first type of terrain.

10. The method of claim 7, wherein defining the first region further comprises growing the first region by:

identifying an outer boundary of the first region;

identifying points within the outer boundary of the first region not yet added to the first region; and adding the points identified within the outer boundary to the first region.

11. The method of claim 8, further comprising:

defining a region border of the first region by:

identifying, using a clustering algorithm, a cluster of points from the three-dimensional representation beyond the outer boundary of the first region;

determining that a number of points in the identified cluster of points exceeds a point number threshold;

identifying points in the cluster of points that fall within a pre-defined distance from the outer boundary; and adding the identified points in the cluster of points to the border of the first region based on the determination that the number of points in the identified cluster of points exceeds the point number threshold and fall within the pre-defined distance from the outer boundary; and wherein generating the final three-dimensional representation further comprises applying a third filter to the region border of the first region, the third filter utilizing a third set of one or more filter parameters different than the second set of one or more filter parameters.

12. A system, comprising:

at least one processor; and at least one non-transitory computer readable storage medium storing instructions that, when executed by the at least one processor, cause the system to:

apply a first filter to a three-dimensional representation of a site utilizing a first set of one or more filter parameters, wherein the first set of one or more filter parameters comprises a first filter height threshold;

define a first region of the filtered three-dimensional representation corresponding to a first type of terrain, wherein the first region comprises a first plurality of points, the first plurality of points being a subset of points of the filtered three-dimensional representation;

generate a final three-dimensional representation by applying a second filter to the first region utilizing a second set of one or more filter parameters different from the first set of one or more filter parameters, the second set of one or more filter parameters comprising a second filter height threshold; and present for display the final three-dimensional representation.

13. The system of claim 12, wherein the first set of one or more filter parameters comprises a first filter radius and the first filter height threshold, the first filter radius comprising a maximum horizontal distance between two points and the first filter height threshold comprising a maximum difference in height values; and wherein the second set of one or more filter parameters comprises a second filter radius larger than the first filter radius and the second filter height threshold, wherein the second filter height threshold is smaller than the first filter height threshold.

14. The system of claim 12, further comprising instructions that, when executed by the at least one processor, cause the computer system to define a second region corresponding to a second type of terrain, wherein the second region comprises a second subset of the points of the three-dimensional representation that does not include points included in the first region; and wherein generating the final three-dimensional representation further comprises applying a third filter to the second region utilizing a third set of one or more filter parameters, wherein the third set of one or more filter parameters differs from the first and second sets of one or more filter parameters.

15. The system of claim 13, wherein applying the first filter to the three-dimensional representation further comprises applying an erosion operation and a dilation operation to the three-dimensional representation utilizing the first filter radius; and wherein applying the second filter to the three-dimensional representation further comprises applying an erosion operation and a dilation operation to the three-dimensional representation utilizing the second filter radius.

16. The system of claim 12, wherein applying the first filter to the three-dimensional representation further comprises:

identifying a difference between a height value of a point of the three-dimensional representation and a height value of a corresponding point of the dilated three-dimensional representation;

comparing the identified difference to the filter height threshold; and based on the comparison, removing the point of the three-dimensional representation from the three-dimensional representation.

17. A computer-implemented method, comprising:

applying a first filter to a three-dimensional point cloud representing a site utilizing a first set of one or more filter parameters, the first set of one or more filter parameters comprising a first filter radius and a first filter height threshold;

defining a first region of the filtered three-dimensional representation corresponding to a first type of terrain, wherein the first region comprises a first plurality of points, the first plurality of points being a subset of points of the filtered three-dimensional representation; and generating a final three-dimensional representation by applying a second filter to the first region utilizing a second set of one or more filter parameters different from the first set of one or more filter parameters, the second set of one or more filter parameters comprising a second filter radius larger than the first filter radius and a second filter height threshold smaller than the first filter height threshold.

18. The method of claim 17, further comprising defining a second region corresponding to a second type of terrain, wherein the second region comprises a second subset of the points of the three-dimensional representation that does not include points included in the first region; and wherein generating the final three-dimensional representation further comprises applying a third filter to the second region utilizing a third set of one or more filter parameters, wherein the third set of one or more filter parameters comprises a third filter height threshold greater than the first filter height threshold and smaller than the second filter height threshold.

19. The method of claim 17,
wherein applying the first filter to the three-dimensional representation further comprises applying an erosion operation and a dilation operation to the three-dimensional representation utilizing the first filter radius; and
wherein applying the second filter to the three-dimensional representation further comprises applying an erosion operation and a dilation operation to the three-dimensional representation utilizing the second filter radius.

20. The method of claim 19, wherein applying the first filter to the three-dimensional representation further comprises:

identifying a difference between a height value of a point of the three-dimensional representation and a height value of a corresponding point of the dilated three-dimensional representation;
comparing the identified difference to the filter height threshold and an auxiliary threshold;
based on the comparison, modifying the three-dimensional representation by replacing the point of the three-dimensional representation with the corresponding point of the dilated three-dimensional representation;
utilizing a clustering algorithm to group the points of the modified three-dimensional representation into a plurality of clusters based on distance between the points;
identifying a largest cluster of the plurality of clusters;
identifying at least one smaller cluster; and
removing one or more points from the three-dimensional representation that correspond to the at least one smaller cluster.

\* \* \* \* \*